(12) United States Patent
Ishioka et al.

(10) Patent No.: US 8,489,125 B2
(45) Date of Patent: Jul. 16, 2013

(54) MOBILE APPARATUS, AND LOCATION NOTIFICATION SYSTEM AND LOCATION NOTIFICATION METHOD FOR MOBILE APPARATUS

(75) Inventors: Eiji Ishioka, Kawasaki (JP); Hitoshi Oshino, Kawasaki (JP); Kazufumi Nara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 375 days.

(21) Appl. No.: 12/388,863

(22) Filed: Feb. 19, 2009

(65) Prior Publication Data

US 2010/0041415 A1    Feb. 18, 2010

(30) Foreign Application Priority Data

Feb. 19, 2008   (JP) ................................ 2008-037703

(51) Int. Cl.
*H04W 24/00* (2009.01)
(52) U.S. Cl.
USPC ............... 455/456.6; 455/435.1; 455/455; 455/441; 455/442; 455/423
(58) Field of Classification Search
USPC ............. 455/566, 445, 433, 404.2, 902, 455, 455/456.6, 522, 435.1, 187, 441, 442, 423; 707/3
See application file for complete search history.

(56) References Cited

U.S. PATENT DOCUMENTS

| 5,914,675 | A | 6/1999 | Tognazzini | |
|---|---|---|---|---|
| 7,630,724 | B2 * | 12/2009 | Beyer et al. | 455/457 |
| 2003/0119522 | A1 * | 6/2003 | Barclay et al. | 455/456 |
| 2003/0119529 | A1 * | 6/2003 | Hirokawa | 455/456 |
| 2006/0116174 | A1 * | 6/2006 | Ide | 455/566 |
| 2009/0124255 | A1 * | 5/2009 | Okubo et al. | 455/435.1 |

FOREIGN PATENT DOCUMENTS

| JP | 10-229455 | 8/1998 |
|---|---|---|
| JP | 2001-218250 | 8/2001 |
| JP | 2001218250 | * 10/2001 |
| JP | 2002-223322 | 8/2002 |
| JP | 2006-157695 | 6/2006 |

OTHER PUBLICATIONS

Japanese Office Action mailed May 8, 2012 for corresponding Japanese Application No. 2008-037703, with English-language translation.
Japanese Office Action mailed Jan. 29, 2013 for corresponding Japanese Application No. 2008-037703, with partial English-language translation.

* cited by examiner

*Primary Examiner* — Manpreet Matharu
(74) *Attorney, Agent, or Firm* — Fujitsu Patent Center

(57) ABSTRACT

A mobile apparatus, that has a calling function, includes: a location-information acquisition unit to acquire location information indicative of a location of the mobile apparatus, and a location-information notification unit to send the location information to a receiving-side apparatus when a call is made to the receiving-side apparatus, the location-information notification unit being further operable to provide, when the call is being made to a receiving-side apparatus, the location information in a manner such that, before a communication connection is established therewith, the receiving-side apparatus can recognize a physical location where the call is being originated based upon the location data.

15 Claims, 26 Drawing Sheets

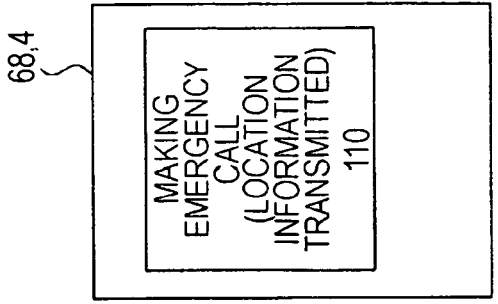
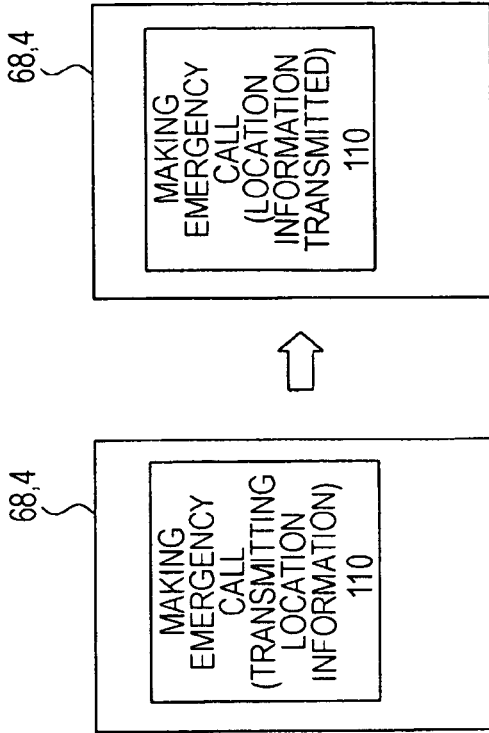
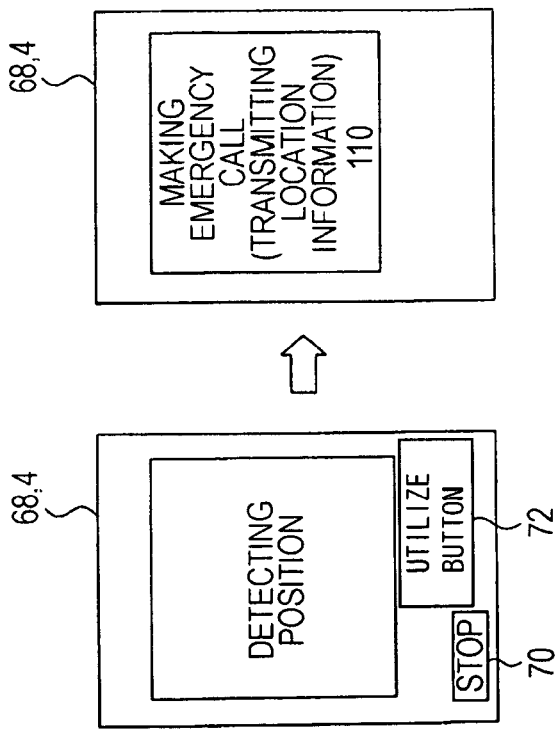
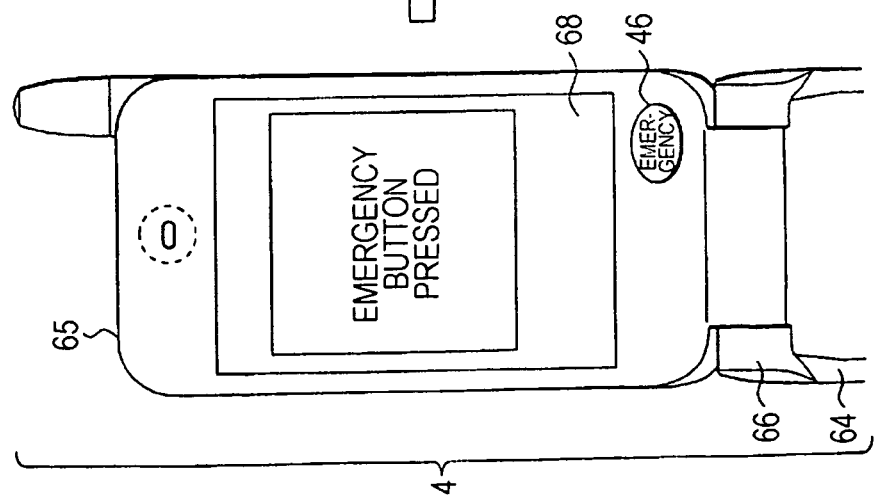

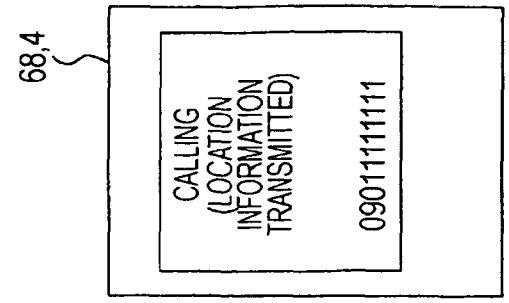
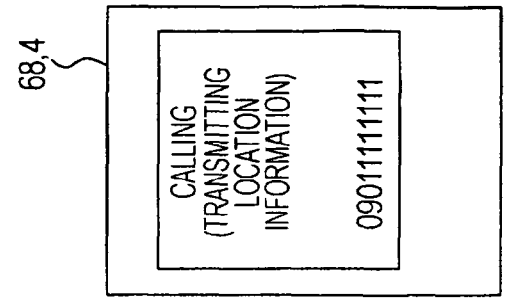
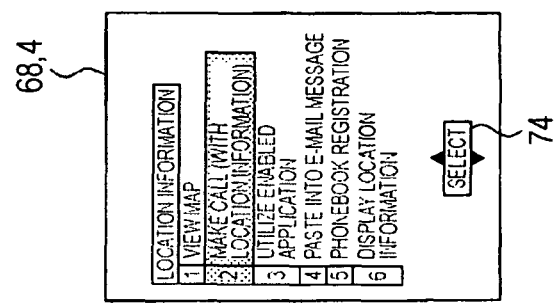
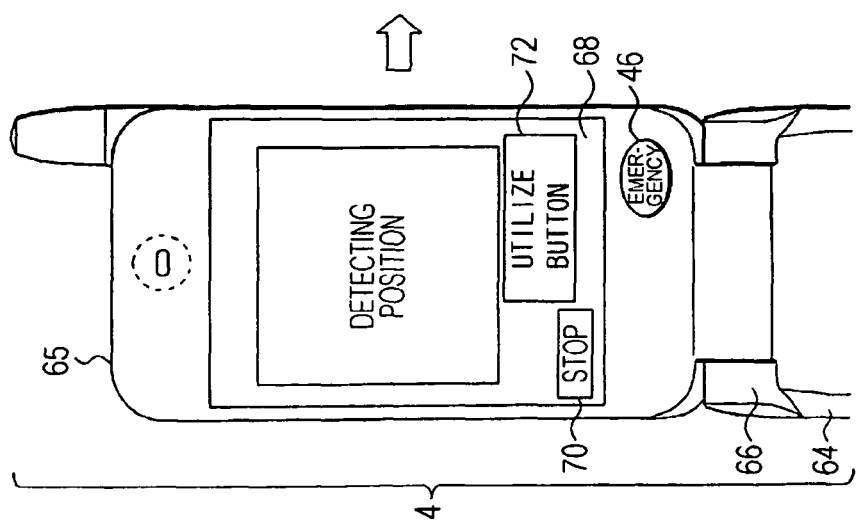

FIG. 19

| PARAMETER NAME | SIZE | SET DESCRIPTION |
|---|---|---|
| Location and Motion IEI | 1 oct | VALUE INDICATING THAT LOCATION/MOVEMENT INFORMATION IS ADDED |
| Length of IE | 1 oct | SET Octet LENGTH OF Location and Motion IE contents<br>SETTING RANGE : 1 THROUGH 253 |
| Location and Motion IE contents | 1 oct - 253 oct | SET FOLLOWING LOCATION INFORMATION<br>(INFORMATION EQUIVALENT TO<br>UE positioning GPS reference UE position)<br>(VALUES ARE EXAMPLES)<br>0x01                       # latitudeSign value<br>0x40, 0x2C, 0xC8          # latitude value<br>0xFF, 0xA4, 0xA8, 0x65    # longitude value<br>0x00                       # altitudeDirection value<br>0x00, 0x19                 # altitude value<br>0x01                       # uncertaintySemiMajor value<br>0x01                       # uncertaintySemiMinor value<br>0x00                       # orientationMajorAxis value<br>0x01                       # uncertaintyAltitude value<br>0x44                       # confidence value<br>0x11                       # speed value |

FIG. 20

| PARAMETER NAME | SIZE | SET DESCRIPTION |
|---|---|---|
| Location and Motion IEI | 1 oct | VALUE INDICATING THAT LOCATION/MOVEMENT INFORMATION IS ADDED |
| Length of IE | 1 oct | SET Octet LENGTH OF Location and Motion IE contents<br>SETTING RANGE : 1 THROUGH 253 |
| Location and Motion IE contents | 1 oct - 253 oct | SET FOLLOWING LOCATION INFORMATION (VALUES ARE EXAMPLES)<br>latitude&longitude&altitude&accuracy&speed<br>(FORMAT IS name=value. USE "&" (AMPERSAND) TO SEPARATE ELEMENTS. ELEMENTS CAN BE OMITTED.)<br>lat=+41.00.35.600&lon=+130.30.00.600&alt=15.11&acc=3&spe=17<br>· LATITUDE (lat)<br>FORMAT IS dms(±dd.mm.ss.sss).<br>SPECIFY NORTHERN LATITUDES WITH "+" AND SOUTHERN LATITUDES WITH "-".<br>REPRESENT DEGREES BY dd, MINUTES BY mm, AND SECONDS BY ss IN BASE 60. AFTER DECIMAL POINT, REPRESENT UP TO THE THIRD DECIMAL PLACE IN BASE 10. WHEN THERE IS THE FOURTH OR HIGHER DECIMAL PLACE, ROUND OFF TO THE THIRD DECIMAL PLACE. HERE, PARAMETERS SUCH AS DEGREES, MINUTES, AND SECONDS ARE SEPARATED BY ".", AND ALL ARE WRITTEN USING 1-BYTE CHARACTER (HALF-SIZE CHARACTER).<br>· LONGITUDE (lon)<br>FORMAT IS dms(±ddd.mm.ss.sss).<br>SPECIFY EASTERN LONGITUDES WITH "+" AND WESTERN LONGITUDES WITH "-".<br>REPRESENT DEGREES BY ddd IN BASE 180. REPRESENT MINUTES BY mm AND SECONDS BY ss IN BASE 60. AFTER DECIMAL POINT, REPRESENT UP TO THE THIRD DECIMAL PLACE IN BASE 10. WHEN THERE IS THE FOURTH OR HIGHER DECIMAL PLACE, ROUND OFF TO THE THIRD DECIMAL PLACE. HERE, PARAMETERS SUCH AS DEGREES, MINUTES, AND SECONDS ARE SEPARATED BY ".", AND ALL ARE WRITTEN USING 1-BYTE CHARACTER (HALF-SIZE CHARACTER).<br>· ALTITUDE (alt)<br>ALTITUDE IS EXPRESSED IN METERS (m) AND REPRESENTED IN BASE 10. THE LENGTH OF VALUE IS VARIABLE. HERE, ALL ARE WRITTEN USING 1-BYTE CHARACTER (HALF-SIZE CHARACTER).<br>· ACCURACY OF POSITION DETECTION (acc)<br>THE ERROR RANGE OF POSITIONING RESULT IS REPRESENTED AS PARAMETER OF ACCURACY.<br>HERE, ALL ARE WRITTEN USING 1-BYTE CHARACTER (HALF-SIZE CHARACTER). ERROR RANGE AND ACCURACY CORRESPOND TO EACH OTHER AS FOLLOWS.<br>ERROR RANGE                ACCURACY<br>HORIZONTAL ERROR < 50[m]    3<br>50[m] ≤ HORIZONTAL ERROR < 300[m]    2<br>300[m] ≤ HORIZONTAL ERROR    1<br>· SPEED (spe)<br>EXPRESSED IN m/s AND REPRESENTED IN BASE 10. THE LENGTH OF VALUE IS VARIABLE. HERE, ALL ARE WRITTEN USING 1-BYTE CHARACTER (HALF-SIZE CHARACTER). |

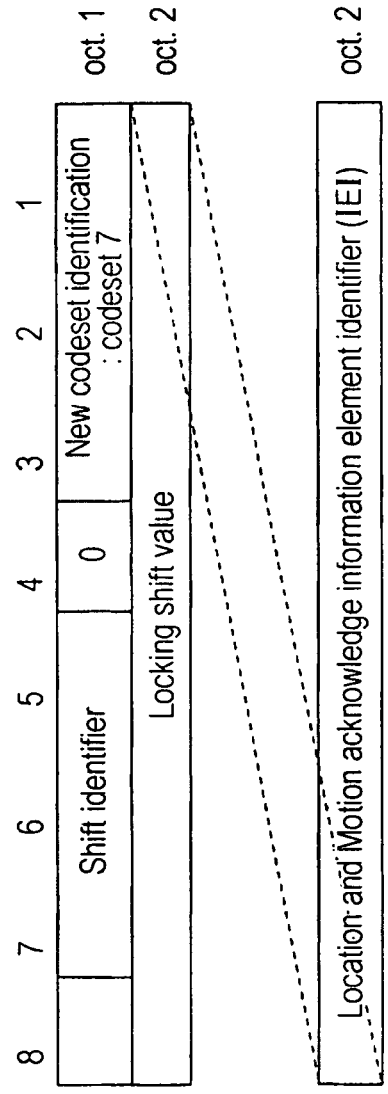

US 8,489,125 B2

MOBILE APPARATUS, AND LOCATION NOTIFICATION SYSTEM AND LOCATION NOTIFICATION METHOD FOR MOBILE APPARATUS

CROSS-REFERENCE TO RELATED APPLICATIONS

This application is based upon and claims the benefit of priority of the prior Japanese patent application No. 2008-037703, filed on Feb. 19, 2008, the entire contents of which are incorporated herein by reference.

FIELD

The present invention relates to a mobile apparatus that has a communication function and is movable, such as a mobile phone, and a communication system for the mobile apparatus. For example, the present invention relates to a mobile apparatus that provides, when the mobile apparatus is a calling-side apparatus, location information thereof to a receiving-side apparatus before a phone connection is established and that can check, when the mobile apparatus is a receiving-side apparatus, the location of a calling-side apparatus, and a location notification system and a location notification method for the mobile apparatus.

BACKGROUND

Mobile apparatuses such as mobile phones can be used to make a call from their location, as a matter of course. Moreover, mobile apparatuses can detect their location via the Global Positioning System (GPS). A service for acquiring the location information of a caller from a network or an emergency-call acceptance institution while an emergency call is being made or after an emergency call has been made is available.

Japanese Laid-open Patent Publication No. 2001-218250 discloses checking of the location of a mobile apparatus and sending of a notification thereof. Japanese Unexamined Patent Application Publication No. 2001-218250 discloses a technology of storing identification information of an individual terminal and identification information of a predetermined intended party in storage unit in a manner such that the identification information of the individual terminal and the identification information of the predetermined intended party are related to each other, and storing a plurality of map information items as a database. Japanese Laid-open Patent Publication No. 2001-218250 discloses a location-information providing system that detects location information of a mobile terminal in accordance with a condition pre-specified by a subscriber, arranges the location information on map information, and sends the location information thereof as additional information to a predetermined receiving-side display terminal by mapping the location information thereof on the map information, in response to an incoming-call request.

Sending of the location of a device from which a call is being made is useful in terms of detection of the place where the call is being made. If it is desired to acquire the location information of a caller from a network or an emergency-call acceptance institution while an emergency call is being made or after an emergency call has been made, the information regarding the emergency call may be detected by another person whom the caller does not want to acquire the information regarding the emergency call. Thus, to prevent another person from acquiring the information regarding the emergency call, the acquisition of the location information is made difficult, whereby it is difficult to specify a location where the call is being made. Even when it is possible to send the location information of a calling-side apparatus, if a receiving-side apparatus cannot receive the location information, sending of the location information is not carried out.

In Japanese Laid-open Patent Publication No. 2001-218250, a technology is described in which detection of the current location of a calling-side terminal is performed and a location detection result is sent to a receiving-side terminal. The detection of the current location of a calling-side terminal is performed by registering a location detection request in advance for an exchange network, from one of the above-described mobile phones or personal handyphone systems (PHSs). Such a technology always requires registration for an exchange network, and thus lacks promptness.

If a calling-side terminal is a fixed telephone, the location thereof can be specified to a certain degree using a phone number thereof; however, if a calling-side terminal is a portable phone, it is impossible to specify the location thereof from a phone number thereof. Even when a portable phone is used, there may be a case in which the location of a portable phone from which a call is being made is desired to be notified to a recipient or a case in which a recipient wants to know the location from which a call is being made.

Japanese Laid-open Patent Publication No. 2001-218250 does not disclose or imply such requests and problems, and does not disclose or imply any structure for solving them and the like.

SUMMARY

An aspect of at least one embodiment provides technology to send location information when a call is being made to a receiving-side apparatus before a phone connection is established, e.g., thereby improving the convenience of mobile communication.

According to an aspect of an embodiment, a mobile apparatus, that has a calling function, includes a location-information acquisition unit to acquire location information indicative of a location of the mobile apparatus, and a location-information notification unit to send the location information to a receiving-side apparatus when a call is made to the receiving-side apparatus.

It is to be understood that both the foregoing general description and the following detailed description are exemplary and are not restrictive of the invention, as claimed.

BRIEF DESCRIPTION OF DRAWINGS

FIGS. 5A, 5B, 5C, and 5D are diagrams illustrating changes of a display screen displayed when an emergency call is made;

FIGS. 6A, 6B, 6C, and 6D are diagrams illustrating changes of a display screen displayed when a call is made at normal times;

FIG. 19 is a diagram illustrating an example of parameter setting information;

FIG. 20 is a diagram illustrating another example of parameter setting information;

FIGS. 21A and 21B are diagrams illustrating examples of a location-information delivery notification parameter field;

DESCRIPTION OF EMBODIMENTS

[First Embodiment]

Figure 1:
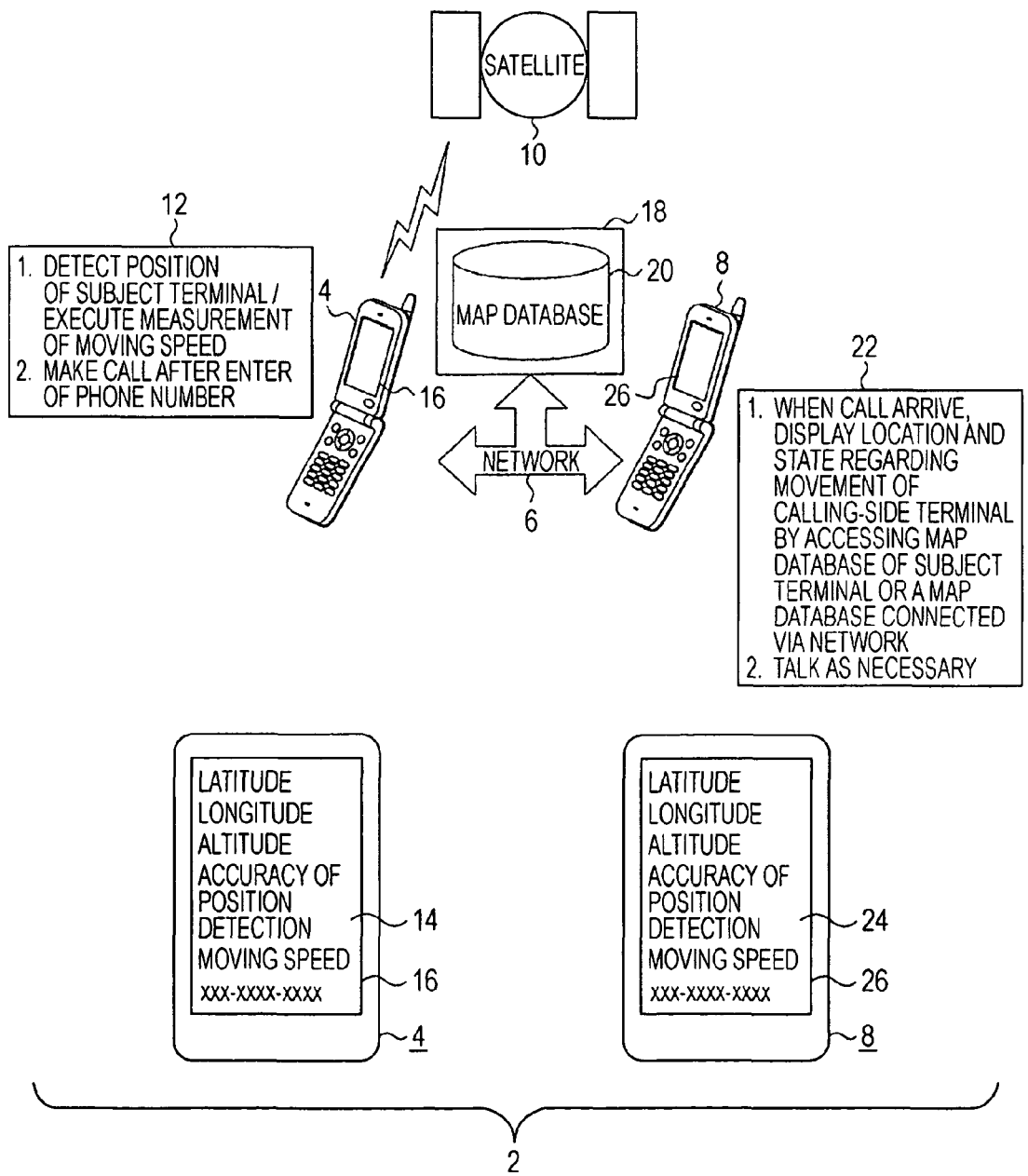
FIG. 1 is a diagram illustrating an example regarding a location notification system and a location notification method for mobile apparatuses according to a first embodiment.

A first embodiment will be described with reference to FIG. 1. FIG. 1 is a diagram illustrating an example regarding a location notification system and a location notification method for mobile apparatuses according to a first embodiment. A structure according to FIG. 1 is an example, and a portable apparatus and a communication system disclosed herein are not limited thereto.

A location notification system 2 for this mobile apparatus is a communication system using mobile apparatuses. The location notification system 2 includes a terminal apparatus 4 as an exemplary mobile apparatus. As a communication apparatus that is connected to the terminal apparatus 4 via a network 6, for example, a terminal apparatus 8 is connected to the terminal apparatus 4. The terminal apparatus 8 is not necessarily a mobile apparatus, and may be a fixed telephone or a personal computer (PC) having a communication function.

The terminal apparatus 4 has a position detection function, a moving-speed measurement function, and a location-information notification function. A GPS function serving as the position detection function is a function to acquire the location of a subject apparatus, that is, the terminal apparatus 4, by receiving a GPS signal from a GPS satellite 10. The location information includes, e.g., a latitude, a longitude, an altitude, and an accuracy of position detection. Regarding the position detection, for example, if this position detection function is executed at desired time intervals, the location of the terminal apparatus 4 can be timely acquired. With the moving-speed measurement function, the moving speed of a subject apparatus, that is, the moving speed of a mobile unit can be acquired. The mobile unit is, for example, a user having the terminal apparatus 4 or a car in which the terminal apparatus 4 is installed. That is, when the terminal apparatus 4 is moving, the location information also includes movement information. The location-information notification function is a function to send the location information of the terminal apparatus 4, which is a subject apparatus, from the terminal apparatus 4 to a receiving-side apparatus thereof. The location-information notification function is a function to send the location information of the terminal apparatus 4 to a receiving-side apparatus, that is, the terminal apparatus 8, before a phone connection is established between the terminal apparatuses 4 and 8, the sending being started when a call is made to the terminal apparatus 8 by entering the phone number of the terminal apparatus 8. Reference numeral 12 shows an exemplary processing procedure performed in the terminal apparatus 4, and reference numeral 14 shows exemplary display contents displayed on a display unit 16 of the terminal apparatus 4.

The terminal apparatus 8 can receive map data from a map database within the terminal apparatus 8 or a map database 20 provided in a server apparatus 18 that is connected to the network 6. If the terminal apparatus 8 receives the location information provided from the terminal apparatus 4 when a call arrives from a calling-side apparatus, that is, the terminal apparatus 4, the terminal apparatus 8 refers to the map data in the map database 20 or map database within the terminal apparatus 8 and displays the location of the terminal apparatus 4 and a state regarding the movement of the terminal apparatus 4 together with a map based on the map data. Reference numeral 22 shows an exemplary processing procedure performed in the terminal apparatus 8, and reference numeral 24 shows exemplary display contents displayed on a display unit 26 of the terminal apparatus 8. A user of the terminal apparatus 8 utilizes the location information provided from the terminal apparatus 4, which is the calling-side apparatus, to determine whether to take a call or whether it is appropriate to establish a phone connection on the basis of, for example, a situation of the caller.

According to this location notification system 2, after the terminal apparatus 4 has acquired the location information thereof, the location information is transmitted to the terminal apparatus 8 at same time a call is made thereto. Thus, when the call arrives at the terminal apparatus 8, before a phone connection is established, the terminal apparatus 8 can specify and recognize a physical location where the call is being originated based upon the location information, i.e., a physical location of the terminal apparatus 4. Hence, in the event of an emergency, just making call sends location information of a caller to an emergency-call acceptance institution without waiting for a position-information acquisition request sent from the network 6 or the emergency-call acceptance institution, and the like, which can improve the convenience of communication.

Since the location notification system 2 can promptly send the location information of a calling-side apparatus to a receiving-side apparatus before a phone connection is established, a user of the receiving-side apparatus can know the location from which the call is being made, without the information regarding the call being detected by another person. Moreover, the location notification system 2 is useful when a user of the calling-side apparatus is moving by public transportation, because the user of the calling-side apparatus can notify the user of the receiving-side apparatus of where the user of the calling-side apparatus is, without talking. The location notification system 2 is useful in helping the user of the calling-side apparatus survive an unexpected contingency, such as a criminal incident. Moreover, the location notification system 2 can specify the location where the call is being made using the location information, and thus can be used to estimate who the caller is on the basis of the location where the call is being made, before a phone connection is established.

In the location notification system 2, movement information is added to the location information. Thus, whether a caller is moving or not can be determined in accordance with the presence of the movement information, and a situation of the caller can be estimated. For example, whether a caller is moving by train can be estimated using movement information of the caller and the location specified on the map, whereby a situation of the caller can be estimated.

Figure 2:
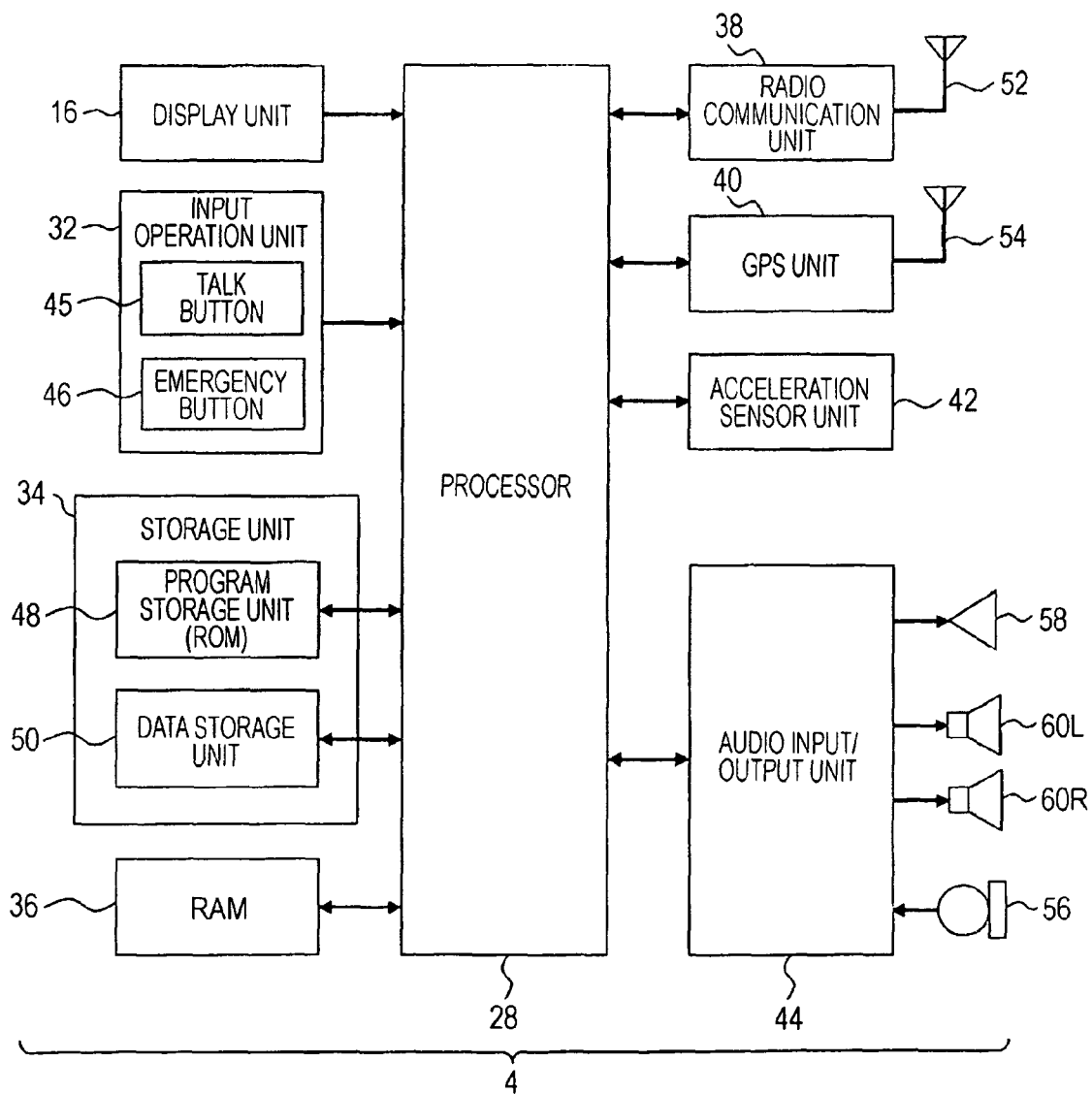
FIG. 2 is a diagram illustrating an exemplary structure of a terminal apparatus.
Figure 3:
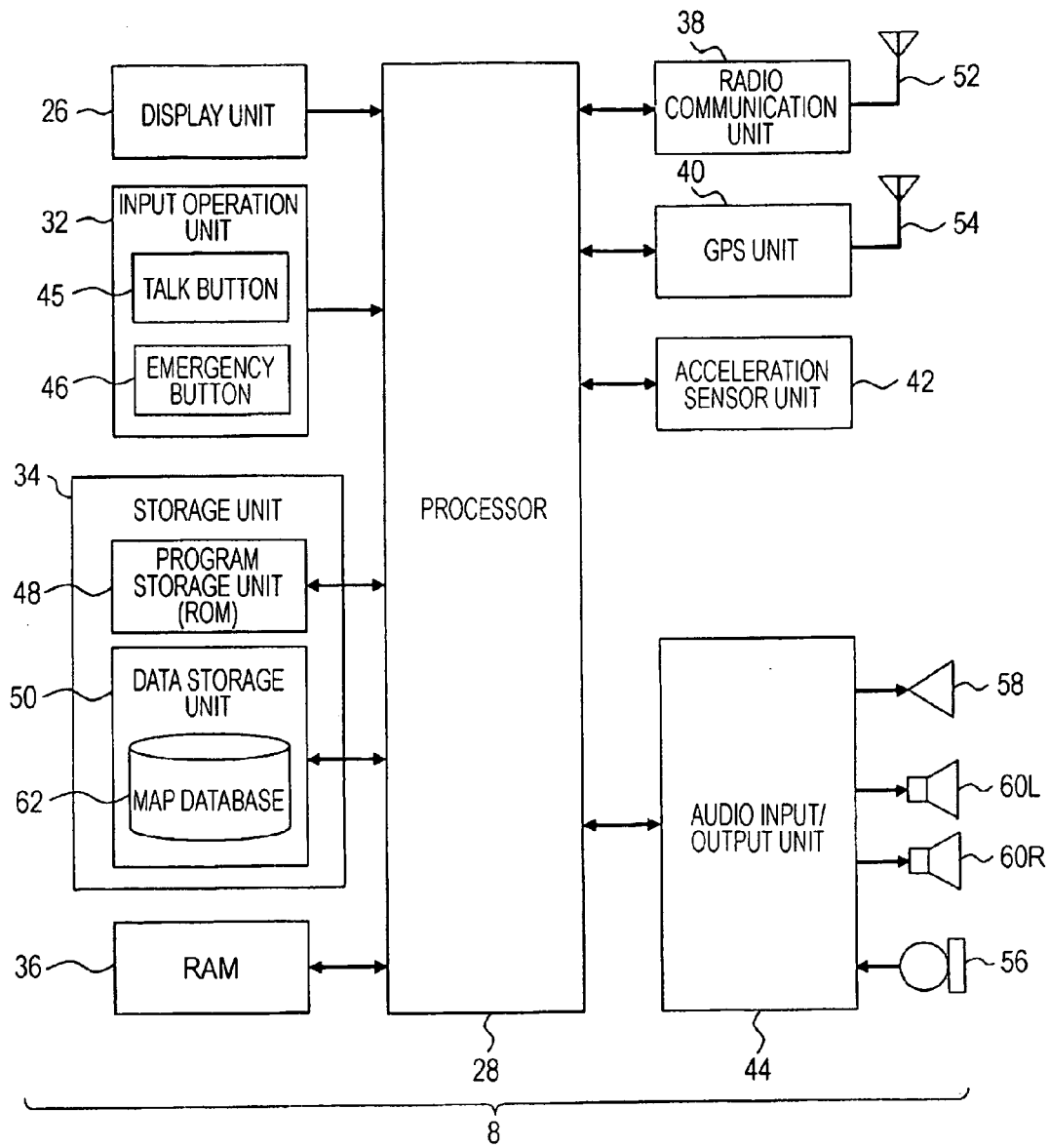
FIG. 3 is a diagram illustrating an exemplary structure of another terminal apparatus.
Figure 4:
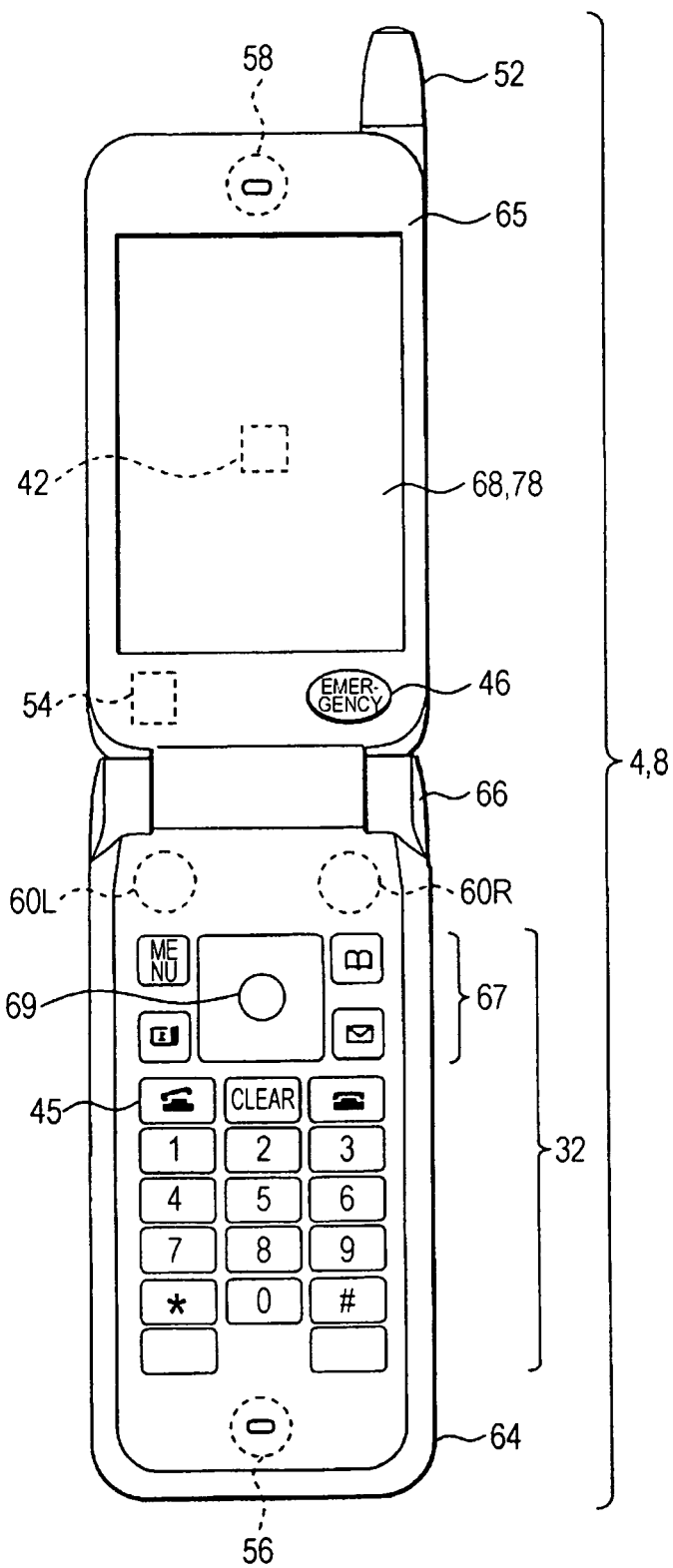
FIG. 4 is a diagram illustrating an example of a terminal apparatus.

Next, the terminal apparatuses 4 and 8 will be described with reference to FIGS. 2, 3, and 4. FIG. 2 is a diagram illustrating an exemplary structure of a terminal apparatus. FIG. 3 is a diagram illustrating an exemplary structure of another terminal apparatus. FIG. 4 is a diagram illustrating an example of a terminal apparatus. Structures illustrated in FIG. 2 through FIG. 4 are examples, and a mobile apparatus and a communication system disclosed herein are not limited thereto. In FIGS. 2 through 4, components the same as those illustrated in FIG. 1 are denoted by the same reference numerals.

As illustrated in FIG. 2, as a structure for realizing the position detection function, the moving-speed measurement function, the location-information notification function, and the like, the terminal apparatus 4 includes, for example, a processor 28, the display unit 16, an input operation unit 32, a storage unit 34, a random access memory (RAM) 36, a radio communication unit 38, a GPS unit 40, an acceleration sensor unit 42, and an audio input/output unit 44.

The processor 28 is control unit for executing communication control such as position detection, moving-speed measurement, and location-information notification, emergency-call control, display control, and control of other functions. The processor 28 includes, for example, a central processing unit (CPU) and a microprocessor unit (MPU), and executes a program stored in the storage unit 34. The display unit 16 is exemplary information display unit for displaying input/output information such as image information and text information. The display unit 16 is, for example, a liquid crystal display (LCD) device. The input operation unit 32 is an input unit to which information is input in accordance with a user operation, and includes a plurality of keys. This input operation unit 32 includes a talk button 45 for making or taking a call and an emergency button 46 as exemplary unit for making a call. The emergency button 46 is used to make an emergency call, and is allocated to any one of or combination of, for example, a "110" call to the police, a "119" call to a fire station, and a maritime emergency call "118".

The storage unit 34 is an exemplary recording medium for storing, for example, programs and data. The storage unit 34 includes a program storage unit 48 and a data storage unit 50. The program storage unit 48 includes, for example, a read-only memory (ROM). An operating system (OS), a location-information notification program, and the like are stored in the program storage unit 48. The data storage unit 50 stores fixed data, acquired location information, and also stores data to be used for calculation. In this data storage unit 50, location information such as a latitude, a longitude, an altitude, and an accuracy of position detection, movement information such as a moving speed, phone numbers, and the like are stored. The RAM 36 represents a work area.

The radio communication unit 38 is radio communication unit used for telephone communication, data communication, and the like, and is exemplary location-information notification unit. The radio communication unit 38 includes an antenna 52, and performs radio communication between a subject terminal apparatus, which includes the radio communication unit 38, and a base station (not illustrated) in accordance with control performed by the processor 28. The GPS unit 40 is exemplary location-information acquisition unit, and includes a GPS antenna 54. The GPS unit 40 receives a GPS signal from the GPS satellite 10 and acquires position information such as a latitude, a longitude, and an altitude, in accordance with control performed by the processor 28.

The acceleration sensor unit 42 is exemplary moving-speed measurement unit, and measures the acceleration of the terminal apparatus 4 and acquires information necessary for speed calculation in accordance with control performed by the processor 28.

The audio input/output unit 44 is input/output unit for audio information, and includes a microphone 56, a receiver 58, and speakers 60L and 60R. The audio input/output unit 44 receives an audio input supplied from the microphone 56 and plays back an audio output through the receiver 58 and/or the speakers 60L and 60R in accordance with control performed by the processor 28.

The terminal apparatus 8 may have the same structure as the terminal apparatus 4. However, in the first embodiment, as illustrated in FIG. 3, as the structure for realizing the position detection function, the moving-speed measurement function, the location-information notification function, and the like, the terminal apparatus 8 includes, for example, the processor 28, the display unit 26, the input operation unit 32, the storage unit 34, the RAM 36, the radio communication unit 38, the GPS unit 40, the acceleration sensor unit 42, and the audio input/output unit 44. A map database 62 is stored in the data storage unit 50. Map data in the map database 62 is used in the processing of displaying the location information sent from the terminal apparatus 4 on a map. Other parts of the structure of the terminal apparatus 8 are the same as those of the structure of the terminal apparatus 4 illustrated in FIG. 2, and thus they are denoted by the same reference numerals and the description thereof will be omitted.

Regarding the terminal apparatuses 4 and 8 having such a structure, as illustrated in FIG. 4, a first housing 64 and a second housing 65 are connected via a hinge unit 66 in an openable and closable manner. The first housing 64 includes the input operation unit 32, and also includes the microphone 56 and the speakers 60L and 60R. The second housing 65 includes the acceleration sensor unit 42, the emergency button 46, the antenna 52, the GPS antenna 54, the receiver 58, and a display screen 68 of the display unit 16 or a display screen 78 of the display unit 26.

Next, with reference to FIGS. 5A, 5B, 5C, and 5D, display control in the event of an emergency will be described. FIGS. 5A, 5B, 5C, and 5D are diagrams illustrating changes of a display screen displayed when an emergency call is made. The display control illustrated in FIGS. 5A, 5B, 5C, and 5D is an example, and a mobile apparatus and a communication system disclosed herein are not limited thereto. In FIGS. 5A, 5B, 5C, and 5D, components the same as those illustrated in FIGS. 1 and 4 are denoted by the same reference numerals.

At the terminal apparatus 4, which is an example of a calling-side apparatus, when the emergency button 46 is pressed, a signal indicating that the emergency button 46 is pressed is input to the processor 28. Then, as illustrated in FIG. 5A, for example, a message "EMERGENCY BUTTON PRESSED" is displayed on the display screen 68 of the display unit 16. While this massage is displayed, the GPS unit 40 executes control of position detection. At the terminal apparatus 4, when this control of position detection is started, as illustrated in FIG. 5B, for example, a message "DETECTING POSITION" is displayed on the display screen 68 so as to indicate that position detection is being performed. On this display screen 68, as control-input display, a stop button 70 for stopping position detection and a utilize button 72 for utilizing position information acquired during position detection are displayed. At the terminal apparatus 4, a command to stop the position detection is issued by pressing a key corresponding to the stop button 70 and a command to utilize position information acquired during position detection is issued by pressing a key corresponding to the utilize button 72, such keys being included in the input operation unit 32.

When position detection has been completed or when the key corresponding to the utilize button 72 is pressed, an emergency call is made from the terminal apparatus 4. As illustrated in FIG. 5C, for example, a message "MAKING EMERGENCY CALL (TRANSMITTING LOCATION INFORMATION)" is displayed on the display screen 68 so as to indicate that an emergency call is being made. Together with this message, for example, "110" is displayed as a phone number which is a phone number of the destination (hereinafter referred to as a "destination phone number"), on the display screen 68. Here, it is assumed that this phone number was set in advance.

The terminal apparatus 4 transmits its location information while an emergency call is being made to a telephone having the phone number "110". When this transmission of the location information has been completed, as illustrated in FIG. 5D, for example, a message "MAKING EMERGENCY CALL (LOCATION INFORMATION TRANSMITTED)" is displayed on the display screen 68 so as to indicate that the transmission of the location information has been completed while an emergency call is being made. In this case, also, for example, "110" is displayed as destination phone number which represents the destination of the location information.

Next, with reference to FIGS. 6A, 6B, 6C, and 6D, display control performed at normal times will be described. FIGS. 6A, 6B, 6C, and 6D are diagrams illustrating changes of a display screen displayed when a call is made at normal times. The display control illustrated in FIGS. 6A, 6B, 6C, and 6D is an example, and a mobile apparatus and a communication system disclosed herein are not limited thereto. In FIGS. 6A, 6B, 6C, and 6D, components the same as those illustrated in FIGS. 1 and 4 are denoted by the same reference numerals.

The terminal apparatus 4 starts control of position detection when a menu screen is operated or when a specific button is pressed more than a certain period of time. As illustrated in FIG. 6A, for example, a message "DETECTING POSITION" is displayed on the display screen 68 of the display unit 16 so as to indicate that the control of position detection is started. As control-input display, together with the stop button 70 for stopping position detection, the utilize button 72 for utilizing position information acquired during position detection is displayed on this display screen 68. At the terminal apparatus 4, a command to stop the position detection is issued by pressing a key corresponding to the stop button 70 and a command to utilize position information acquired during position detection is issued by pressing a key corresponding to the utilize button 72, such keys being included in the input operation unit 32.

The terminal apparatus 4 changes its mode from a position-detection mode to an information-display mode when position detection has been completed or when the key corresponding to the utilize button 72 is pressed. When its mode is changed to the information-display mode, as illustrated in FIG. 6B, "LOCATION INFORMATION" is displayed as a title on the display screen 68.

Furthermore, the followings are operation choices regarding the location information, displayed on the display screen 68:

1 VIEW MAP
2 MAKE CALL (WITH LOCATION INFORMATION)
3 UTILIZE ENABLED APPLICATION
4 PASTE INTO E-MAIL MESSAGE
5 PHONEBOOK REGISTRATION
6 DISPLAY LOCATION INFORMATION

A selection button 74 is also displayed on the display screen 68. This selection button 74 corresponds to a cursor 67 illustrated in FIG. 4, and is used to make a selection from among the above-described operation choices.

After "2 MAKE CALL (WITH LOCATION INFORMATION)" has been selected from the operation choices displayed on the display screen 68, if a phone number is entered or a phone number is selected from a telephone-number database, a call is made from the terminal apparatus 4.

The terminal apparatus 4 transmits its location information while a call is being made to the terminal apparatus 8. As illustrated in FIG. 6C, for example, a message "CALLING (TRANSMITTING LOCATION INFORMATION)" is displayed on the display screen 68 so as to indicate that the location information is being transmitted while a call is being made. Together with this message, for example, "09011111111" is displayed as a destination phone number.

When the transmission of this location information has been completed, as illustrated in FIG. 6D, for example, a message "CALLING (LOCATION INFORMATION TRANSMITTED)" is displayed on the display screen 68 of the terminal apparatus 4 so as to indicate that the transmission of location information has been completed while a call is being made. In this case, also, for example, "09011111111" is displayed as a destination phone number which represents the destination of the location information.

Figure 7A:
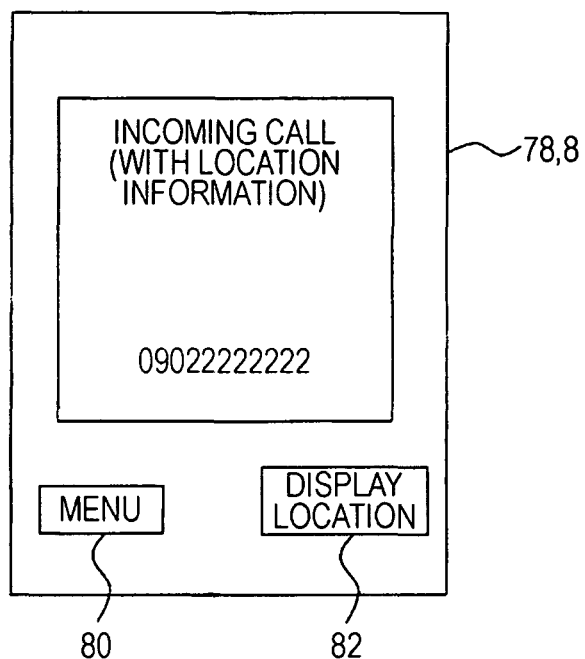
FIGS. 7A, 7B, and 7C are diagrams illustrating changes of a display screen of a receiving-side apparatus.
Figure 7B:
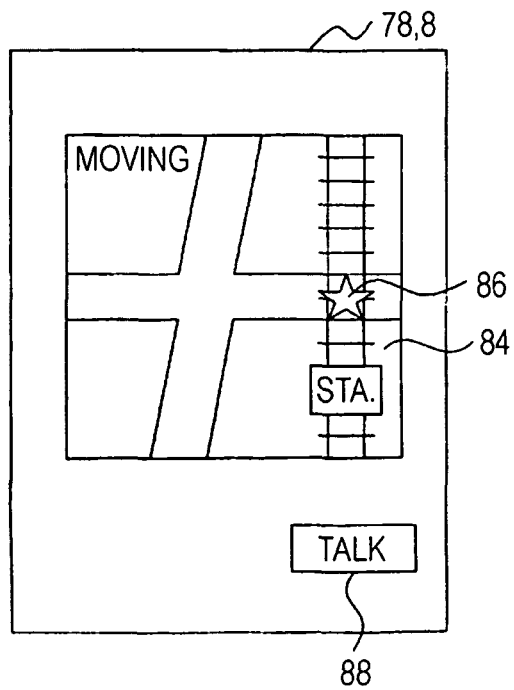
Figure 7C:
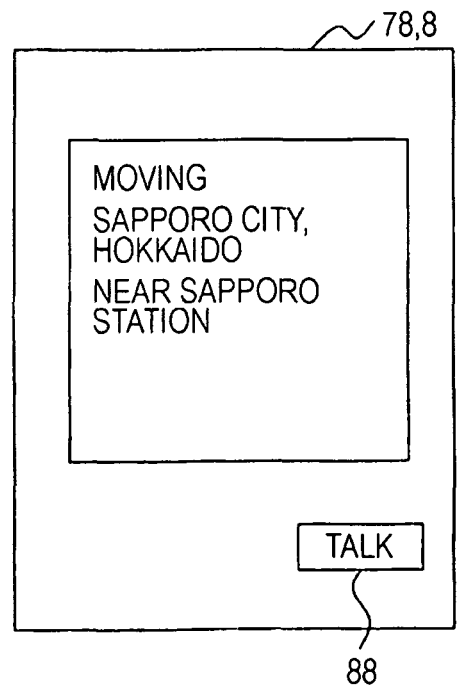

Next, with reference to FIGS. 7A, 7B, and 7C, display control performed at a receiving-side apparatus will be described. FIGS. 7A, 7B, and 7C are diagrams illustrating changes of a display screen of a receiving-side apparatus. The display control illustrated in FIGS. 7A, 7B, and 7C is an example, and a mobile apparatus and a communication system disclosed herein are not limited thereto. In FIGS. 7A, 7B, and 7C, components the same as those illustrated in FIG. 1 are denoted by the same reference numerals.

A case will be described in which a call arrives at the terminal apparatus 8, which is an example of a receiving-side apparatus, from the terminal apparatus 4, which is an example of a calling-side apparatus. As illustrated in FIG. 7A, for example, a message "INCOMING CALL (WITH LOCATION INFORMATION)" is displayed on the display screen 78 of the terminal apparatus 8 so as to indicate that a call arrives and location information is added thereto. Together with this message, the phone number of a calling-side apparatus from which the call is being made is displayed. On this display screen 78, a menu button (MENU) 80, which is menu selection unit, and a location display button 82 for switching between display and non-display of a location are also displayed as control-input display. The menu button 80 and the location display button 82 correspond to, for example, the cursor 67 illustrated in FIG. 4. When the location display button 82 is pressed, the mode of the terminal apparatus 8 is changed to a location display mode. As illustrated in FIG. 7B, when location information indicates that a calling-side apparatus is moving, a message "MOVING" and a map 84 are displayed on the display screen 78. On the map 84, a location mark 86 representing the location of the calling-side apparatus is displayed. A talk button 88 for taking a call is displayed at a bottom area of the display screen 78. The talk button 88 corresponds to the cursor 67, and also corresponds to the talk button 45 of the input operation unit 32. When the talk button 88 is pressed, the terminal apparatus 8 changes its mode to a talk mode. In this embodiment, the location mark 86 is a star mark; however, it may be a symbol or a pattern, and furthermore, the symbol or pattern may blink.

When the location display button 82 is pressed, the terminal apparatus 8 can also display an address display screen on which a subject address is expressed using characters, in accordance with map display. As illustrated in FIG. 7C, for example, a message "MOVING" indicating that a calling-side apparatus is moving and the address of the location of the calling-side apparatus are displayed on the display screen 78. In this case, also, the talk button 88 is displayed on the display screen 78, and pressing of the talk button 88 can establish a phone connection between the calling-side and receiving-side apparatuses.

Figure 8:
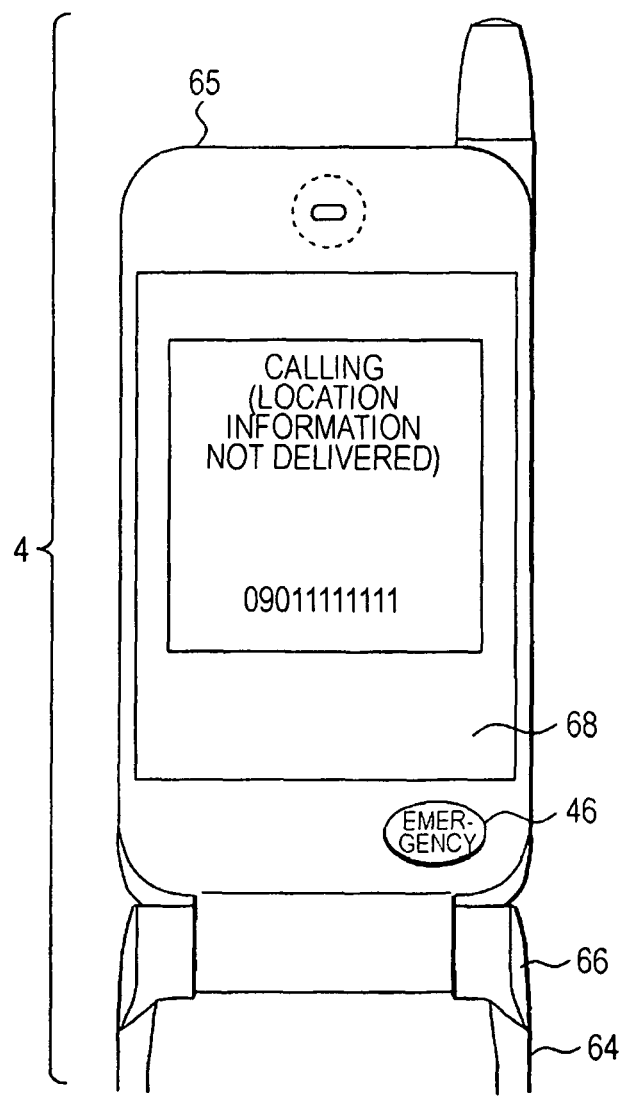
FIG. 8 is a diagram illustrating a display screen of a calling-side apparatus.

Next, with reference to FIG. 8, display indicating that location information was not delivered will be described. FIG. 8 is a diagram illustrating a display screen of a calling-side apparatus. The structure illustrated in FIG. 8 is an example, and a mobile apparatus and a communication system disclosed herein are not limited thereto. In FIG. 8, components the same as those illustrated in FIGS. 1 and 4 are denoted by the same reference numerals.

Even if the location information is transmitted from the terminal apparatus 4, which is a calling-side apparatus, to the terminal apparatus 8, when the location information is not displayed at the terminal apparatus 8, a notification that the location information was not delivered is sent to the terminal apparatus 4 from the terminal apparatus 8. In this case, as illustrated in FIG. 8, in response to the notification sent from the terminal apparatus 8, a message "CALLING", a message "LOCATION INFORMATION NOT DELIVERED", and the phone number of the terminal apparatus 8 are displayed on the display screen 68 of the terminal apparatus 4. Thus, the caller is notified that the location information was not delivered to the recipient.

Figure 9:
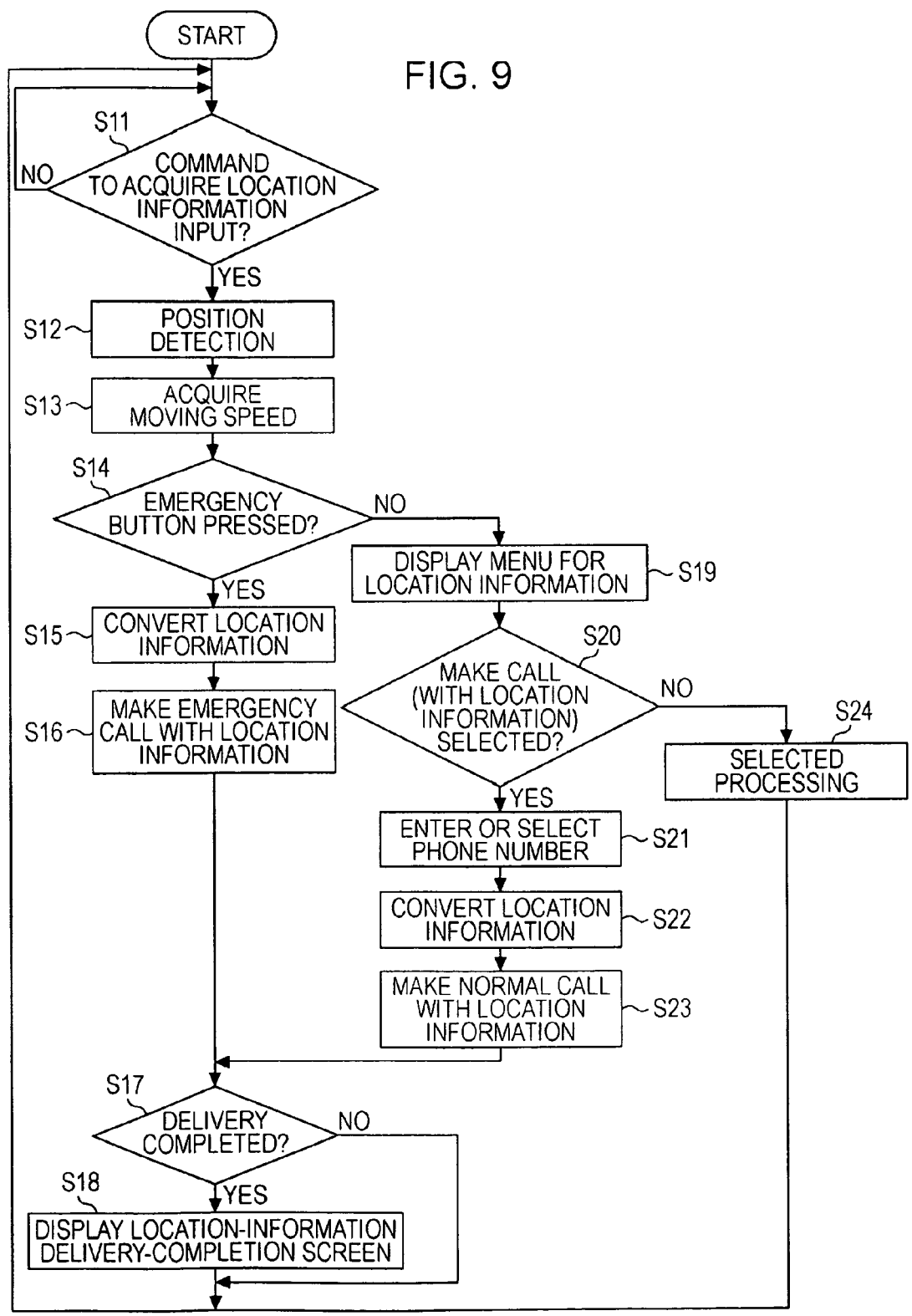
FIG. 9 is a flowchart illustrating a processing procedure of acquisition and transmission of location information.

Next, with reference to FIG. 9, acquisition and transmission processing of location information will be described. FIG. 9 is a flowchart illustrating a processing procedure of acquisition and transmission of location information. A processing procedure illustrated in FIG. 9 is an example, and a mobile apparatus and a communication system disclosed herein are not limited thereto.

This processing procedure is an example of a location notification method and its program. The processing procedure includes a processing procedure performed at normal times and a processing procedure in the event of an emergency.

At the terminal apparatus 4, a command to acquire location information is input via a displayed menu screen. It is determined whether a command to acquire location information has been input (step S11). If it is determined that such a command has been input (YES in step S11), the terminal apparatus 4 performs position detection to acquire location information (step S12), and subsequently to this position detection, acquires a moving speed thereof (step S13). In these steps S12 and S13, both of the location and moving speed of the terminal apparatus 4 are measured.

The terminal apparatus 4 monitors whether the emergency button 46 has been pressed (step S14). If it is determined that the emergency button 46 has been pressed (YES in step S14), the location information is converted into transmission information (step S15) and an emergency call is made with the location information, that is, an emergency call with location information is made (step S16). The terminal apparatus 4 monitors whether the location information has been delivered (step S17). If it is determined that the location information has been delivered (YES in step S17), a screen indicating that the location information was delivered is displayed (step S18), and the transmission processing of the location information is completed. In this case, as a notification that the location information has been delivered, ALERT may be displayed. To establish a phone connection from this state, the talk button 45 (88) needs to be pressed.

In step S14, if it is determined that the emergency button 46 has not been pressed (NO in step S14), the current screen is changed to a location-information operation selection menu screen, and a location-information operation selection menu is displayed (step S19). If the emergency button 46 is not pressed, this unit that the call being made is a call being performed at a normal time (hereinafter referred to as a "normal call"). At the terminal apparatus 4, it is determined whether an operation for making a call with location information has been selected or not (step S20). If it is determined that the operation for making a call with location information has been selected (YES in step S20), a phone number can be entered or selected (step S21). After a phone number has been entered or selected, the acquired location information is converted into transmission information at the terminal apparatus 4 (step S22), and a normal call with location information is made from the terminal apparatus 4 to a phone having the entered or selected phone number (step S23), and the procedure proceeds to step S17. Even in the case of a normal call, processing of monitoring whether the location information has been delivered is executed (step S17) and processing of performing screen display indicating that the location information was delivered is executed (step S18).

In step S20, if it is determined that the operation for making a call with location information has not been selected (NO in step S20), processing other than processing of making a call with location information, that is, processing regarding an operation choice selected from the location-information operation selection menu display (step S19) is executed at the terminal apparatus 4 (step S24). In this case, screen display indicating that the location information was delivered is not performed.

Figure 10:
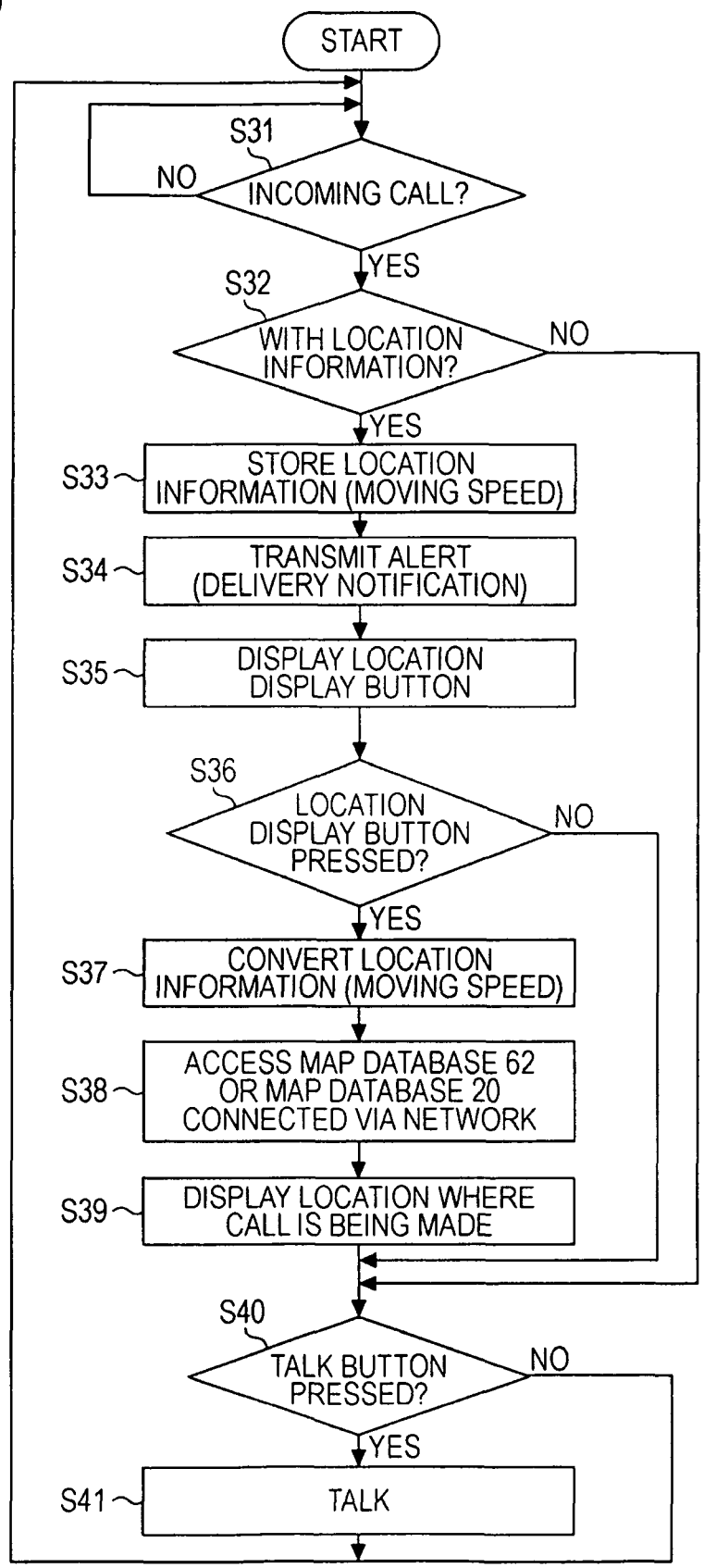
FIG. 10 is a flowchart illustrating a processing procedure of reception processing of the location information at the receiving-side apparatus.

Next, with reference to FIG. 10, receiving processing of location information will be described. FIG. 10 is a flowchart illustrating a processing procedure of reception processing of the location information at the receiving-side apparatus. A processing procedure illustrated in FIG. 10 is an example, and a mobile apparatus and a communication system disclosed herein are not limited thereto.

With reference to the terminal apparatus 8 illustrated in FIG. 3, this receiving processing will be described. This terminal apparatus 8 monitors whether there is an incoming call (step S31). If there is an incoming call, it is determined whether location information is attached, that is, location information is included (step S32). If it is determined that the incoming call is an incoming call with location information (YES in step S32), the terminal apparatus 8 stores the location information. Furthermore, if the location information includes a moving speed, the terminal apparatus 8 stores the moving speed together with the location information (step S33). The terminal apparatus 8 transmits an ALERT signal in which a notification that the location information was delivered and displayed is set (such a notification is hereinafter referred to as a "delivery notification") (step S34). In this case, as illustrated in FIG. 7A, the location display button 82 is displayed on the display screen 78 (step S35), and the terminal apparatus 8 monitors whether the location display button 82 has been pressed (step S36). This location display button 82 is pressed by selecting the location display button 82 using the cursor 67 illustrated in FIG. 4 and pressing a decision key 69. If it is determined that the location display button 82 has been pressed (YES in step S36), conversion processing of the location information or the moving speed is started in the terminal apparatus 8 (step S37), and the terminal apparatus 8 accesses the map database 62 therein or map database 20 connected via the network 6 (step S38). As a result, the location where the call is being made is displayed on the display screen 78 of the terminal apparatus 8 (step S39). Then, the terminal apparatus 8 checks whether the talk button 45 (88) has been pressed.

In step S32, if it is determined that the incoming call is not a call with location information (NO in step S32), the procedure skips steps S33 through S39 and proceeds to step S40 in the terminal apparatus 8. Moreover, in step S36, if it is determined that the location display button 82 has not been pressed (NO in step S36), the procedure similarly proceeds to step S40 in the terminal apparatus 8.

In step S40, the terminal apparatus 8 monitors whether the talk button 45 (88) has been pressed. If it is determined that the talk button 45 has been pressed (YES in step S40), a phone connection is established between terminal apparatuses 4 and 8 (step S41). If it is determined that the talk button 45 has not been pressed (NO in step S40), processing of this incoming call ends without a phone connection being established.

Figure 11:
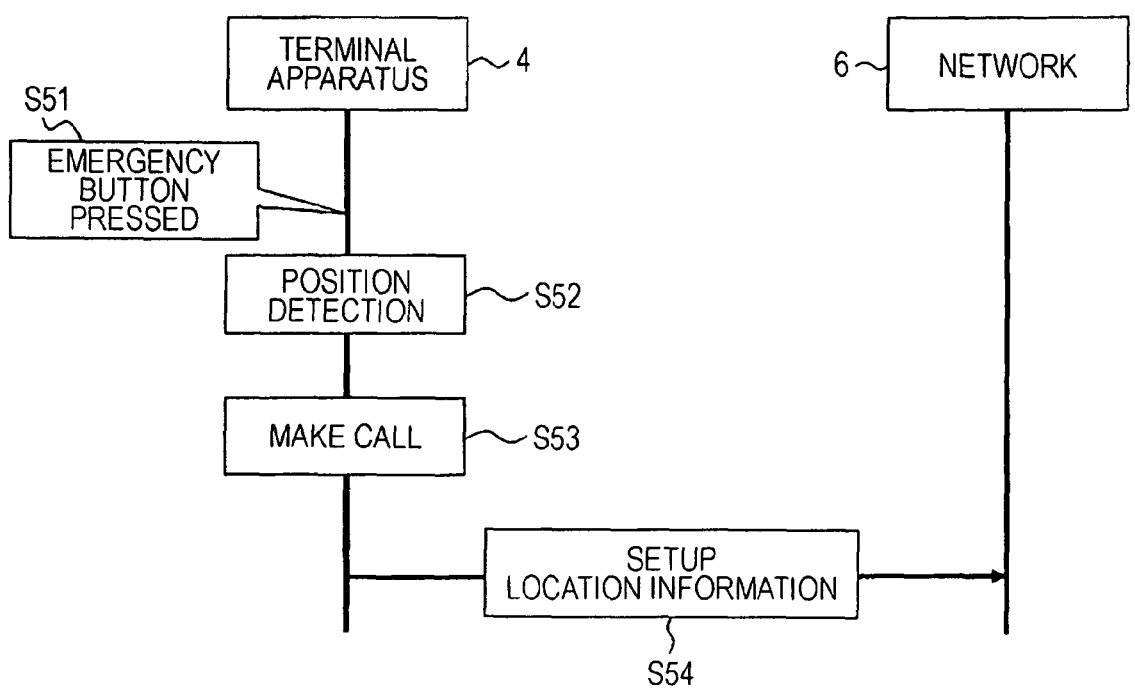
FIG. 11 is a diagram illustrating processing performed between a terminal apparatus and a network when an emergency call is made.
Figure 12:
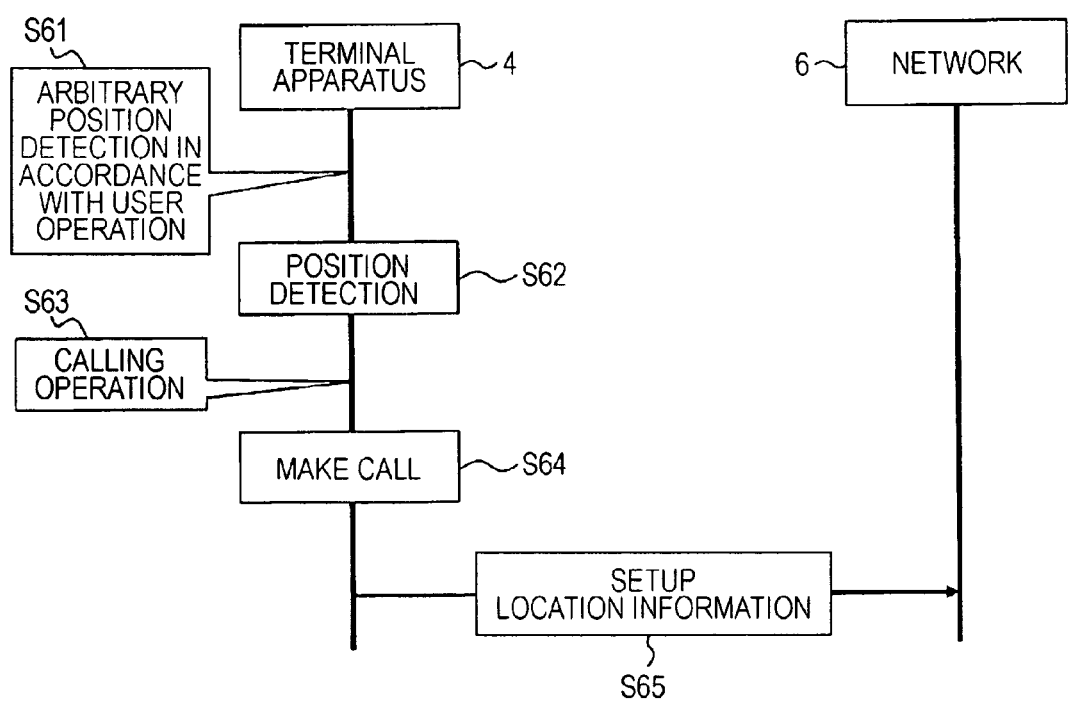
FIG. 12 is a diagram illustrating processing performed between the terminal apparatus and the network when a call is made at normal times.
Figure 13:
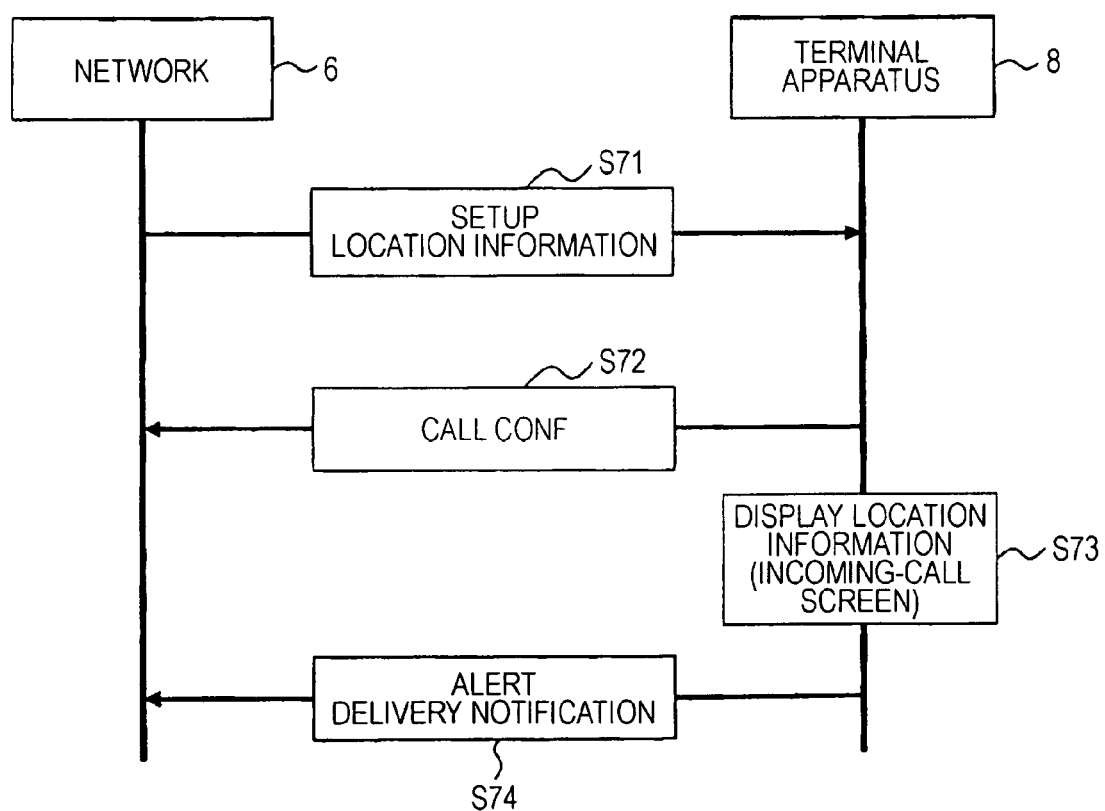
FIG. 13 is a diagram illustrating processing performed between the network and a terminal apparatus when a call arrives.
Figure 14:
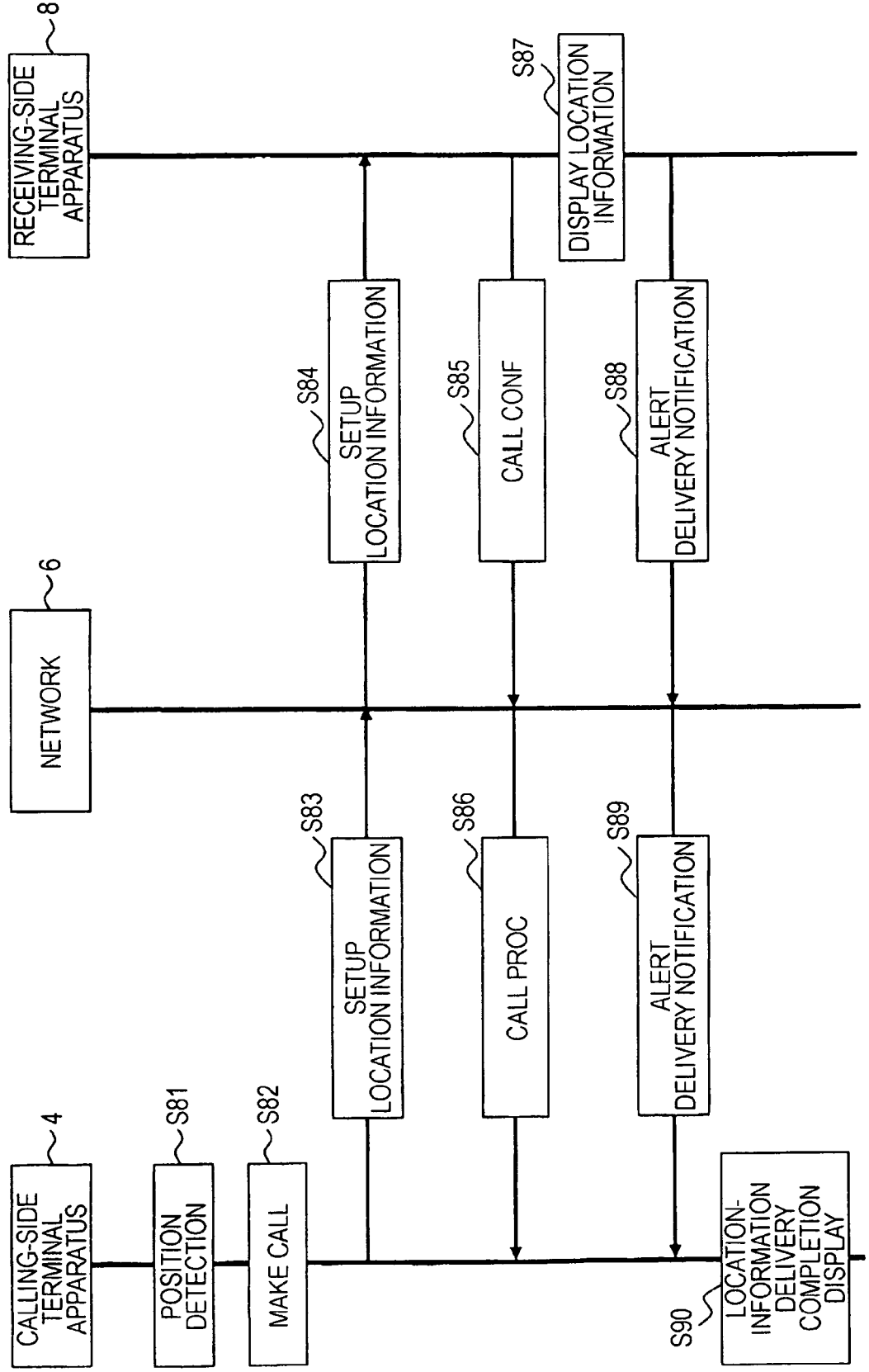
FIG. 14 is a diagram illustrating transmission-and-reception timing of location information, the transmission and reception being performed between terminal apparatuses.
Figure 15:
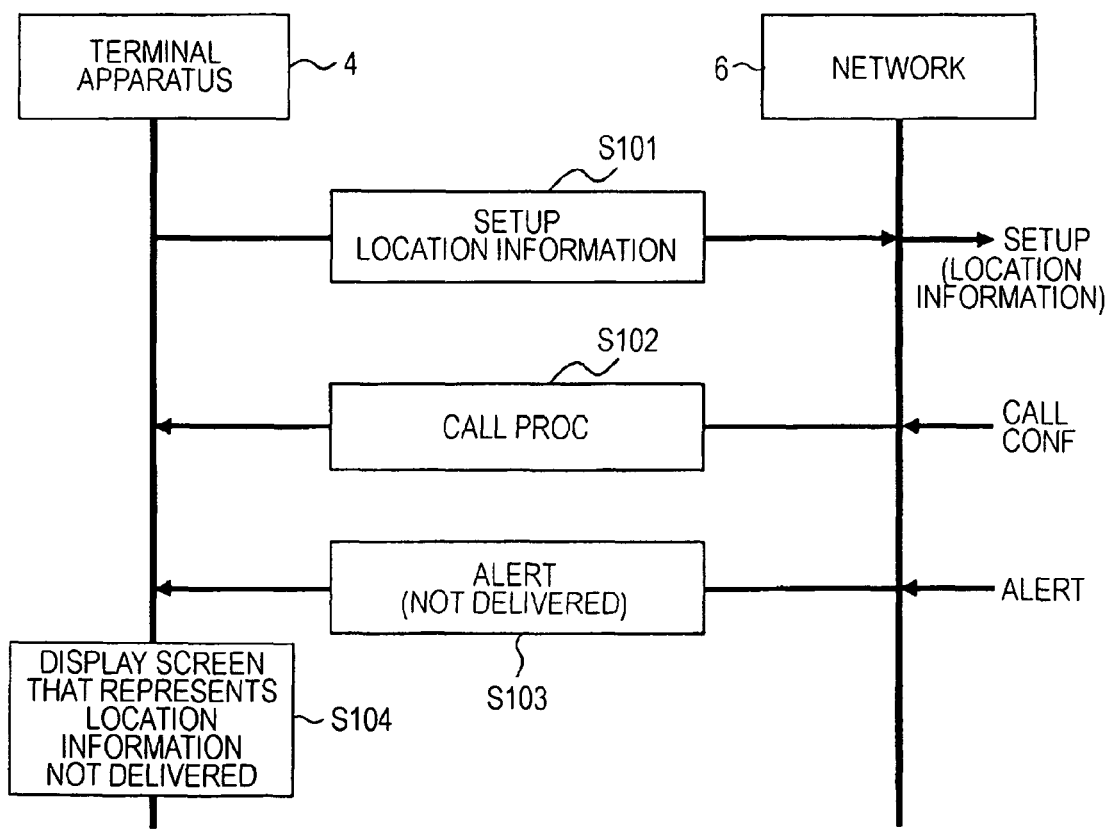
FIG. 15 is a diagram illustrating notification processing for a case in which location information was not delivered.

Next, with reference to FIGS. 11, 12, 13, 14, and 15, transmission and reception of location information and a transmission-and-reception timing thereof will be described, the transmission and reception being performed between terminal apparatuses. FIG. 11 is a diagram illustrating processing performed between a terminal apparatus and a network when an emergency call is made. FIG. 12 is a diagram illustrating processing performed between the terminal apparatus and the network when a call is made at normal times. FIG. 13 is a diagram illustrating processing performed between the network and a terminal apparatus when a call arrives. FIG. 14 is a diagram illustrating transmission-and-reception timing of location information, the transmission and reception being performed between terminal apparatuses. FIG. 15 is a diagram illustrating notification processing for a case in which location information was not delivered. Processing procedures illustrated in FIGS. 11, 12, 13, 14, and 15 are examples, and a mobile apparatus and a communication system disclosed herein are not limited thereto.

The processing procedure performed between the terminal apparatus 4 and the network 6 in a case in which an emergency call is made includes a process in which location information acquired by performing position detection in the terminal apparatus 4 is transmitted to the network 6. As illustrated in FIG. 11, in this processing procedure, if the emergency button 46 is pressed at the terminal apparatus 4 (step S51), position detection is executed in the terminal apparatus 4 (step S52). When acquisition of the location information performed by this position detection has been completed, a call is made (step S53). When a call is made, the location information added to SETUP signal serving as a signal for connection and is transmitted to the network 6 (step S54).

In the processing procedure performed between the terminal apparatus 4 and the network 6 at normal times, as illustrated in FIG. 12, position detection is arbitrarily executed in accordance with a user operation in the terminal apparatus 4. When a command to perform position detection is input, position detection is performed in accordance with this command (step S61). The terminal apparatus 4 executes acquisition of location information by performing this position detection (step S62), and location information is acquired. In accordance with a user operation for making a call (step S63), a call is made (step S64). When this call is made, the location information added to SETUP signal serving as a signal for connection and transmitted to the network 6 (step S65). In this case, also, when the terminal apparatus 4 is moving, it is detected whether the terminal apparatus 4 is moving in accordance with the acceleration detected by the acceleration sensor unit 42, and the movement information is included in the location information.

In the processing performed between the network 6 and the terminal apparatus 8 in a case in which a call arrives, when the location information added to SETUP signal has been received from the network 6, the map database 62 within the terminal apparatus 8 or the map database 20 connected via the network 6 is accessed, and the location information is displayed on the display screen 78 of the terminal apparatus 8 which shows an incoming-call screen illustrated in FIG. 7A. At the terminal apparatus 8, processing is performed in which an ALERT signal is transmitted to the network 6, a delivery notification being set in the ALERT signal.

In this processing, as illustrated in FIG. 13, the terminal apparatus 8 received the SETUP signal from network 6 (step S71), and a CALL CONF signal is sent as a response signal to the network 6 from the terminal apparatus 8 that has received the SETUP signal (step S72). The location information indicating the location and movement of the terminal apparatus 4 will be displayed on the display screen 78 of the terminal apparatus 8, which shows an incoming-call screen illustrated in FIG. 7B (step S73). After this location information has been displayed, the ALERT signal is transmitted from the terminal apparatus 8 to the network 6 as a delivery notification (step S74).

A transmission-and-reception timing of location information, the transmission and reception being performed between the terminal apparatuses 4 and 8, is as follows. As illustrated in FIG. 14, after position detection has been performed in the terminal apparatus 4, which is a calling-side apparatus (step S81), a call is made (step S82). After call is made, the SETUP signal to which location information has been added is transmitted from the terminal apparatus 4 to the network 6 (step S83), the SETUP signal to which the location information has been added is transmitted from the network 6 to the terminal apparatus 8, which is a receiving-side apparatus (step S84). The CALL CONF signal is transmitted as a response signal from the terminal apparatus 8 to the network 6 (step S85), and a CALL PROC signal is transmitted from the network 6 to the terminal apparatus 4 (step S86).

When the terminal apparatus 8, which is a receiving-side apparatus, receives the SETUP signal to which the location information has been added (step S84), the terminal apparatus 8 displays the location information (step S87) and transmits the ALERT signal in which a delivery notification has been set is transmitted as notification processing to the network 6 (step S88). Then, the ALERT signal in which the delivery notification has been set is similarly transmitted from the network 6 to the terminal apparatus 4 (step S89). The terminal apparatus 4, which is a calling-side apparatus and has received the delivery notification, performs location-information delivery-completion display on the display screen 68 illustrated in FIG. 8 (step S90), and a user is notified of the location-information delivery completion.

At the terminal apparatus 4, whether the location information has been displayed at the terminal apparatus 8, which is a receiving-side apparatus, is displayed on the display screen 68 which shows a calling screen indicating that a call is being made, in accordance with the delivery notification set in the ALERT signal transmitted from the network 6. This display screen 68, which shows a calling screen, is displayed after reception of the ALERT signal and before reception of a CONNECT signal. Here, in a case in which the location information is not displayed at the terminal apparatus 8, which is a receiving-side apparatus, a delivery notification is not set in an ALERT signal. Thus, display indicating that the location information was not delivered is performed on the display screen 68 of the terminal apparatus 4.

In this case, the processing in which display indicating that location information was not delivered is performed is illustrated in FIG. 15. The SETUP signal to which the location information has been added is transmitted from the terminal apparatus 4 to the network 6 (step S101). The network 6 receives the CALL CONF signal from the terminal apparatus 8, which is not illustrated in FIG. 15, and transmits the CALL PROC signal to the terminal apparatus 4 (step S102). In a case in which the location information is not displayed, the ALERT signal transmitted from the terminal apparatus 8, which is not illustrated, is transmitted to the terminal apparatus 4 from the network 6 (step S103). In this case, a delivery notification is not set in the ALERT signal, and thus information indicating that the location information was not delivered is displayed on the display screen 68 of the terminal apparatus 4 illustrated in FIG. 8 (step S104).

As described above, effects and advantages of the first embodiment are as follows.

In the first embodiment, since the terminal apparatus 4, which is a mobile apparatus, includes position-detection unit and speed measurement unit and also includes location-information notification unit, the terminal apparatus 4 can send location information thereof such as position information and speed information by the notification unit to a receiving-side apparatus or an emergency-call acceptance institution. Moreover, the terminal apparatus 4 can send the location information before a phone connection is established.

In the first embodiment, the received location information can be displayed by display unit, and display of the received location information can be performed on an incoming-call screen. Thus, the location information can be displayed before a phone connection is established.

By pressing the emergency button 46, the location information of the terminal apparatus 4 can be sent to a phone having a specific number from the terminal apparatus 4 when a call is made therefrom.

Since the terminal apparatus 4 includes the acceleration sensor unit 42, the terminal apparatus 4 can calculate the moving speed at the time of performing position detection and can also send the moving speed to the terminal apparatus 8, which is a receiving-side apparatus. The terminal apparatus 8 can detect whether the terminal apparatus 4, which is a calling-side apparatus, is moving.

In the first embodiment, as a location-information acquisition function, for example, the location information acquired by the terminal apparatus 4 including a GPS unit can be displayed on the display screen of the terminal apparatus 8 before a phone connection is established, and the location of the terminal apparatus 4, which is a calling-side apparatus, can be specified when a call arrives at the terminal apparatus 8. Moreover, when the terminal apparatus 4 is moving, the movement information of the terminal apparatus 4 can be displayed on the display screen of the terminal apparatus 8, and the location information of the terminal apparatus 4 can be displayed on a map using the map database 20 or 62 at the terminal apparatus 8.

Regarding existing portable phones and PHSs, if they are not registered in advance to an exchange network, location detection of a calling-side apparatus cannot be performed; however, in the first embodiment, the location information of the terminal apparatus 4, a calling-side apparatus, can be sent to a receiving-side apparatus without the need for such a registration function.

It has been impossible to specify the location of a portable phone just using a phone number thereof; however, in the first embodiment, the location information of the terminal apparatus 4, a calling-side apparatus, can be automatically sent to a receiving-side apparatus and the receiving-side apparatus can easily detect the location of the calling-side apparatus on a display screen thereof before a phone connection is established.

In the first embodiment, after the terminal apparatus 4 has acquired location information by performing position detection and calculating the moving speed, the terminal apparatus 4 can transmit the location information such as a latitude and a longitude to a receiving-side apparatus at same time a call is made from the terminal apparatus 4 to the receiving-side apparatus. Moreover, the terminal apparatus 8 refers to the map database 62 within the terminal apparatus 8 or accesses the map database 20 connected via the network 6 using the received location information, and displays the location of the calling-side apparatus and a map together. Thus, the location of the calling-side apparatus can be specified on the map.

Since the location information can be sent to a receiving-side apparatus when a call is made and before a phone connection is established, even when a user of the receiving-side apparatus is on the train or the like, the location of a calling-side apparatus can be sent to the receiving-side apparatus. The location of the terminal apparatus 4, a calling-side apparatus, can be specified from the displayed location information at a receiving-side apparatus, and the user of the receiving-side apparatus can utilize the displayed location information to determine whether to take the call in accordance with the location of the calling-side apparatus.

Acquisition of location information of the terminal apparatus 4 can easily be realized by using a GPS unit, and precise location information can be acquired and sent to a receiving-side apparatus.

In the first embodiment, while an emergency call (110, 119, or 118) is being made or after the emergency call is made, if the location information of a caller is desired to be acquired from the network 6 or an emergency-call acceptance institution, the location information can be sent to an intended person or institution without the information regarding the call being detected by another person.

With existing apparatuses, when a user of a calling-side apparatus makes a call to notify the current location thereof to a user of a receiving-side apparatus, if the user of the receiving-side apparatus is in a situation in which the user cannot take the call, the location information cannot be sent until another call is made and a phone connection is established. However, in the first embodiment, the terminal apparatus 8, which is a receiving-side apparatus, can receive the current location of the calling-side apparatus even in that situation.

In the first embodiment, after the terminal apparatus 4 has acquired the location information thereof, the terminal apparatus 4 can transmit the location information including a latitude and a longitude to the terminal apparatus 8 at same time a call is made from the terminal apparatus 4 to the terminal apparatus 8. According to the Background Art, a phone connection must be established before a user of a receiving-side apparatus checks the location of a calling-side apparatus; however, in the first embodiment, a user of a receiving-side apparatus can check the location of a calling-side apparatus before a phone connection is established, that is, before the call is taken by the user of the receiving-side apparatus.

In the first embodiment, pressing of the emergency button 46 of the terminal apparatus 4 starts position detection using the GPS, and thereafter the location information thereof can be transmitted to a pre-registered number (110, 119, or 118/a specific number) and sending of the location information can be promptly performed.

In the first embodiment, the location information of the terminal apparatus 4 can be acquired by pressing the emergency button 46 of the terminal apparatus 4 or in accordance with a user operation, and the terminal apparatus 4 can transmit the location information including a latitude and a longitude to a receiving-side apparatus at same time an emergency call is made from the terminal apparatus 4 to the receiving-side apparatus. Moreover, the terminal apparatus 4 can send the location information of the caller to an emergency-call acceptance institution without waiting for a position information acquisition request sent from the network 6 or an emergency-call acceptance institution. This can be used to deter or prevent crimes and is helpful for criminal investigation.

In the first embodiment, when there is an incoming call made from a caller whose Caller ID is blocked or an incoming call made from a phone having a phone number that is unknown to the user of a receiving-side apparatus, the location information sent from the terminal apparatus 4, which is a calling-side apparatus, can be utilized to determine whether the call should be taken.

In the first embodiment, whether a calling-side apparatus is moving can be identified from the movement information. For example, as illustrated in FIG. 7B, if there is incoming information including location information regarding a location on a railroad and movement information indicating that the calling-side apparatus is moving, a recipient can assume the caller's situation such as a situation in which the caller is moving by train.

[Second Embodiment]

Figure 16:
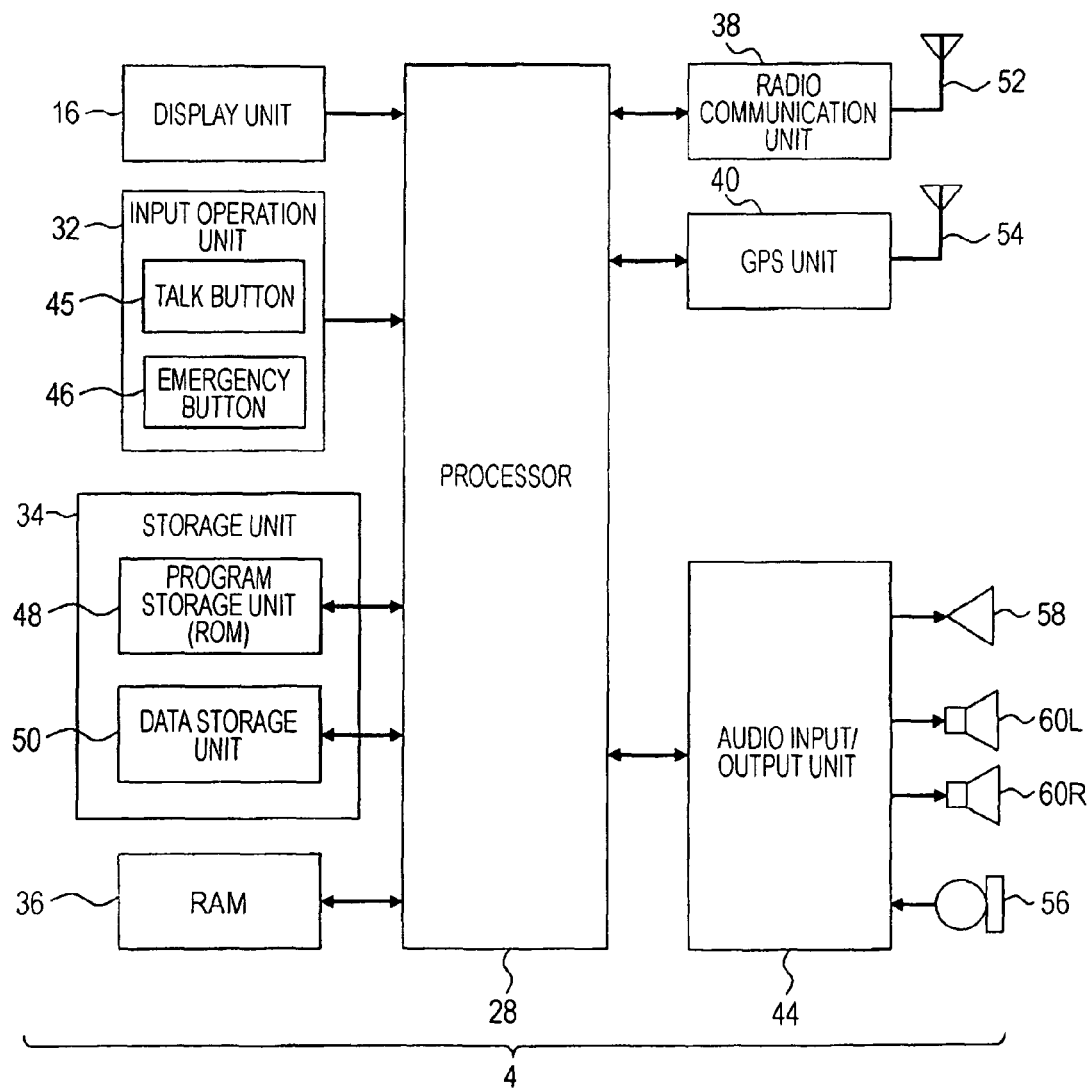
FIG. 16 is a diagram illustrating an example regarding a location notification system and a location notification method for mobile apparatuses according to a second embodiment.

In the first embodiment, the acceleration sensor unit 42 is provided in the terminal apparatus 4, and speed information is calculated from acceleration information detected by the acceleration sensor unit 42 and the speed information is transmitted as movement information to the terminal apparatus 8. However, as illustrated in FIG. 16, the acceleration sensor unit 42 may be eliminated and the terminal apparatus 4 may be configured to acquire location information thereof and movement information as a result of position detection using the GPS unit 40. Moreover, the position information may only be used as the location information. In FIG. 16, components the same as those in FIG. 2 are denoted by the same reference numerals and the description thereof will be omitted.

[Third Embodiment]

Figure 17:
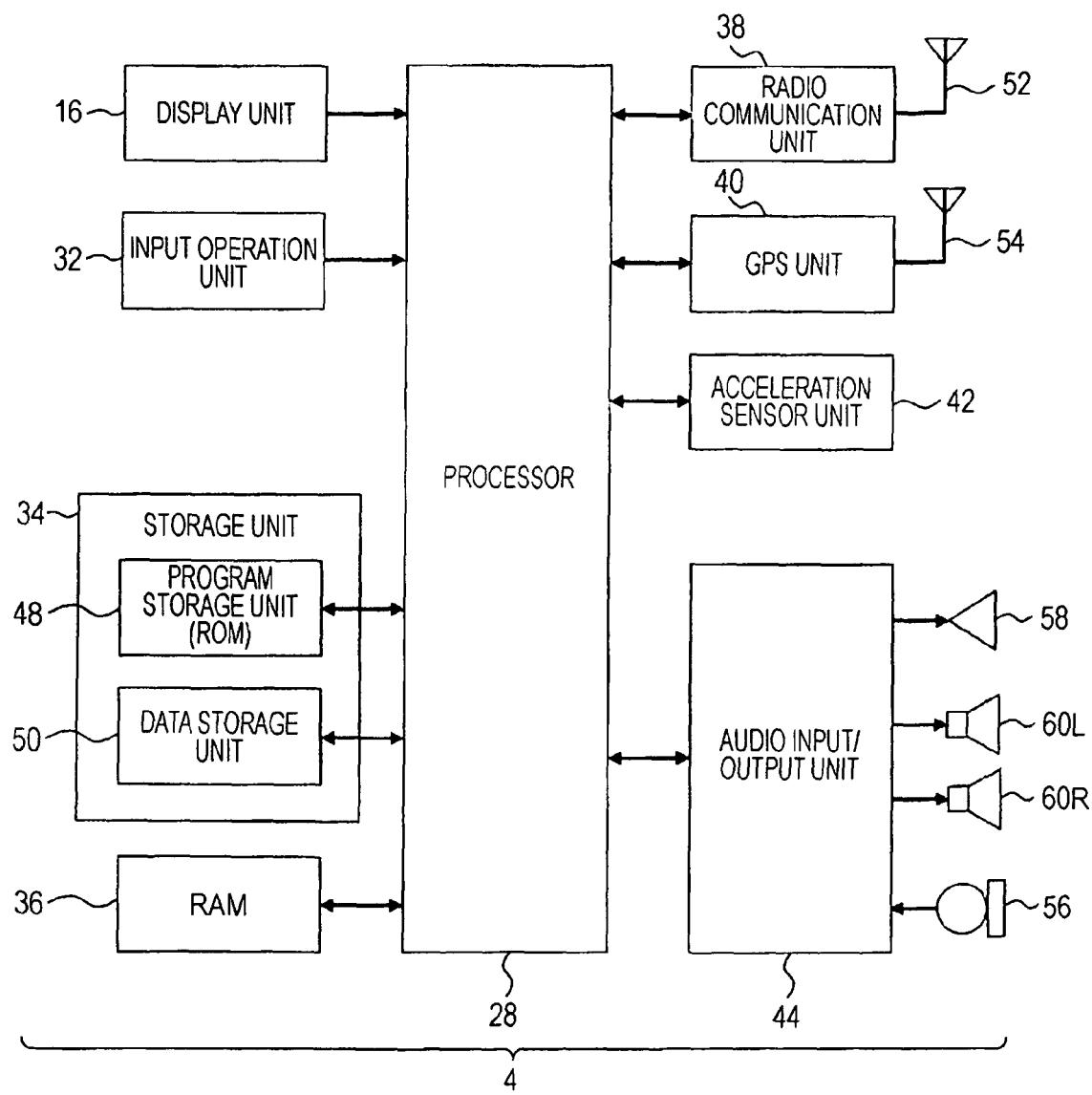
FIG. 17 is a diagram illustrating an example regarding a location notification system and a location notification method for mobile apparatuses according to a third embodiment.

In the first embodiment, the emergency button 46 is included in the input operation unit 32, and is configured to acquire location information when the emergency button 46 is pressed and to transmit the location information to the terminal apparatus 8 and the like. However, as illustrated in FIG. 17, the emergency button 46 may be eliminated. That is, a button for making only a normal call may be allocated to a key of the input operation unit and a button for making an emergency call may be allocated to a key of the input operation unit. The key to which the button for making an emergency call is allocated may be set to select an emergency call number recorded in a phone-number database. In FIG. 17, components the same as those in FIG. 2 are denoted by the same reference numerals and the description thereof will be omitted.

[Fourth Embodiment]

In processing sequences illustrated in FIGS. 11, 12, 13, and 14 in the first embodiment, location information is acquired by performing position detection; however, they may be designed to calculate movement information using acceleration information detected by the acceleration sensor unit 42 at the same time this position detection is performed, before the position detection is performed, or after the position detection has been performed.

[Other Embodiment]

Figures 18A, 18B:
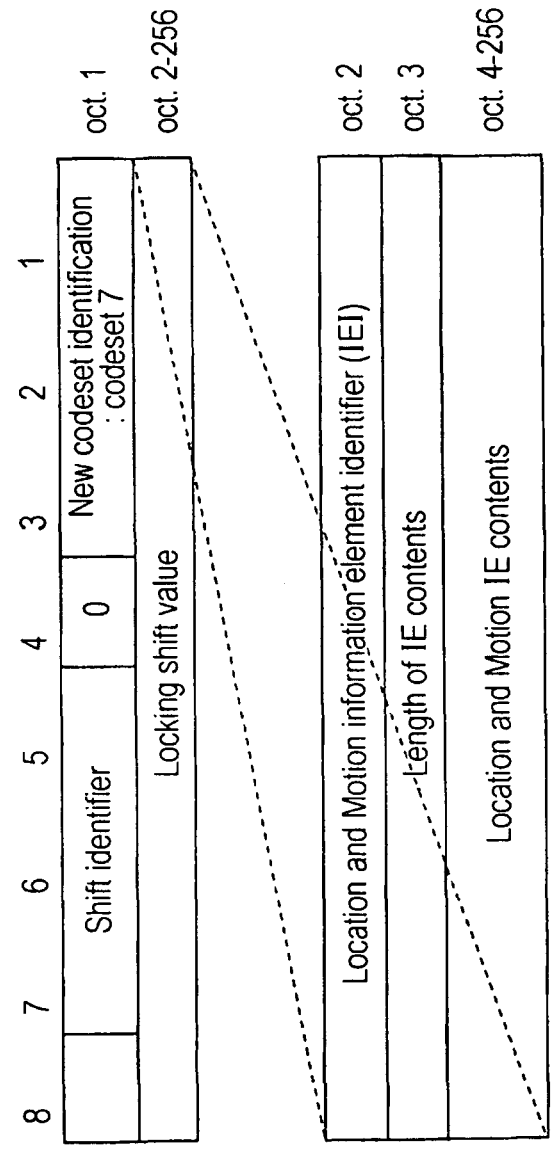
FIGS. 18A and 18B are diagrams illustrating an example of a location-information parameter field.

Next, with reference to FIGS. 18A, 18B, 19, 20, 21A, and 21B, the set information will be described. FIGS. 18A and 18B are diagrams illustrating an example of a location-information parameter field. FIG. 19 is a diagram illustrating an example of parameter setting information. FIG. 20 is a diagram illustrating another example of parameter setting information. FIGS. 21A and 21B are diagrams illustrating examples of a location-information delivery notification parameter field. Structures illustrated in FIGS. 18A, 18B, 19, 20, 21A, and 21B are examples, and a mobile apparatus and a communication system disclosed herein are not limited thereto.

As illustrated in FIG. 18A, when location information is transmitted, a parameter field and parameter setting information include a parameter "Shift identifier", "0", a parameter "New codeset identification:codeset 7", and a parameter "Locking shift value". A set location of the parameter "Shift identifier", "0", and the parameter "New codeset identification:codeset 7" is octet1. This is based on 3GPP TS24.008 10.5.4.2 Locking shift procedure. Moreover, a set location of the parameter "Locking shift value" is from octet2 up to octet256. This is based on ARIB TR-T12-27.A02.

Then, as illustrated in FIG. 18B, the parameter "Locking shift value" includes a parameter "Location and Motion information element identifier (IEI)", a parameter "Length of IE contents", and a parameter "Location and Motion IE contents". A set location of the parameter "Location and Motion information element identifier (IEI)" is octet2, a set location of the parameter "Length of IE contents" is octet3, and a set location of the parameter "Location and Motion IE contents" is from octet4 up to octet256.

As illustrated in FIG. 19, the parameter setting information includes the parameter "Location and Motion IEI", the parameter "Length of IE", and the parameter "Location and Motion IE contents". Regarding the parameter "Location and Motion IEI", the size thereof is 1 [oct.], and a set description thereof is a "value indicating that location/movement information is added". Regarding the parameter "Length of IE", the size thereof is 1 [oct.], a set description thereof is "set an Octet length of Location and Motion IE contents", and a set range thereof is "1- through 253". Regarding the parameter "Location and Motion IE contents", the size thereof is 1- through 253 [oct.], and location information is set to this parameter. That is, location information is set that is information equivalent to a user equipment (UE) positioning GPS reference UE position. For example, values of setting information are set as follows.

"0×01# latitudeSign value
0×40, 0×2C, 0×C8# latitude value
0×FF, 0×A4, 0×A8, 0×65# longitude value
0×00# altitudeDirection value
0×00, 0×19# altitude value
0×01# uncertaintySemiMajor value
0×01# uncertaintySemiMinor value
0×00# orientationMajorAxis value
0×01# uncertaintyAltitude value
0×44# confidence value
0×11# speed value"

As illustrated in FIG. 20, the parameter "Locking shift value" includes the parameter "Location and Motion IEI", the parameter "Length of IE", and the parameter "Location and Motion IE contents". Regarding the parameter "Location and Motion IEI", the size thereof is 1 [oct.], a set description thereof is a "value indicating that location/movement information is added". Regarding the parameter "Length of IE", the size thereof is 1 [oct.], and a set description thereof is "set an Octet length of Location and Motion IE contents", and a set range thereof is "1- through 253". These are the same as those of an embodiment illustrated in FIG. 19.

Regarding the parameter "Location and Motion IE contents", the size thereof is 1- through 253 [oct.], and location information is set to this parameter. The set description thereof is as follows.

"Set the following location information. (Values are examples.)

latitude & longitude & altitude & accuracy & speed {the format is set name=value, and use "&" (an ampersand) to separate elements. Elements can be omitted.} lat=+41.00.35.600&lon=+130.30.00.600&alt=15.11&acc=3&spe=1 7

Latitude (lat)
The format is dms(±dd.mm.ss.sss).
Specify northern latitudes with "+" and southern latitudes with "−".
Represent degrees by dd, minutes by mm, and seconds by ss in base 60. After the decimal point, represent up to the third decimal place in base 10. When there is the fourth or higher decimal place, round off to the third decimal place. Here, the parameters such as degrees, minutes, and seconds are separated by ".", and all are written using a 1-byte character (a half-size character).

Longitude (lon)
The format is dms(±ddd.mm.ss.sss).
Specify eastern longitudes with "+" and western longitudes with "−".
Represent degrees by ddd in base 180. Represent minutes by mm and seconds by ss in base 60. After the decimal point, represent up to the third decimal place in base 10. When there is the fourth or higher decimal place, round off to the third decimal place. Here, the parameters such as degrees, minutes, and seconds are separated by ".", and all are written using a 1-byte character (a half-size character).

Altitude (alt)
An altitude is expressed in meters (m) and represented in base 10. The length of a value is variable. Here, all are written using a 1-byte character (a half-size character).

Accuracy of position detection (acc)
The error range of a position-detection result is represented as a parameter of accuracy of position detection (PD). Here, all are written using a 1-byte character (a half-size character).
The error range and accuracy correspond to each other as follows.
Error RangeAccuracy of PD
Horizontal Error<50 [m]3
50 [m]≦Horizontal Error<300 [m]2
300 [m]≦Horizontal Error1

Speed (spe)
A speed is expressed in m/s and represented in base 10. The length of a value is variable. Here, all are written using a 1-byte character (a half-size character)."

As illustrated in FIG. 21A, a location-information delivery notification parameter field and parameter setting information include the parameter "Shift identifier", "0", the parameter "New codeset identification:codeset 7", and the parameter "Locking shift value". A set location of the parameter "Shift identifier", "0", and parameter "New codeset identification:codeset 7" is octet1. This is based on 3GPP TS24.008 10.5.4.2 Locking shift procedure. Moreover, a set location of the parameter "Locking shift value" is octet2, and this is based on ARIB TR-T12-27.A02.

As illustrated in FIG. 21B, the parameter "Locking shift value" is constituted by a parameter "Location and Motion acknowledge information element identifier (IEI)", and a set location thereof is octet2.

Figure 22:
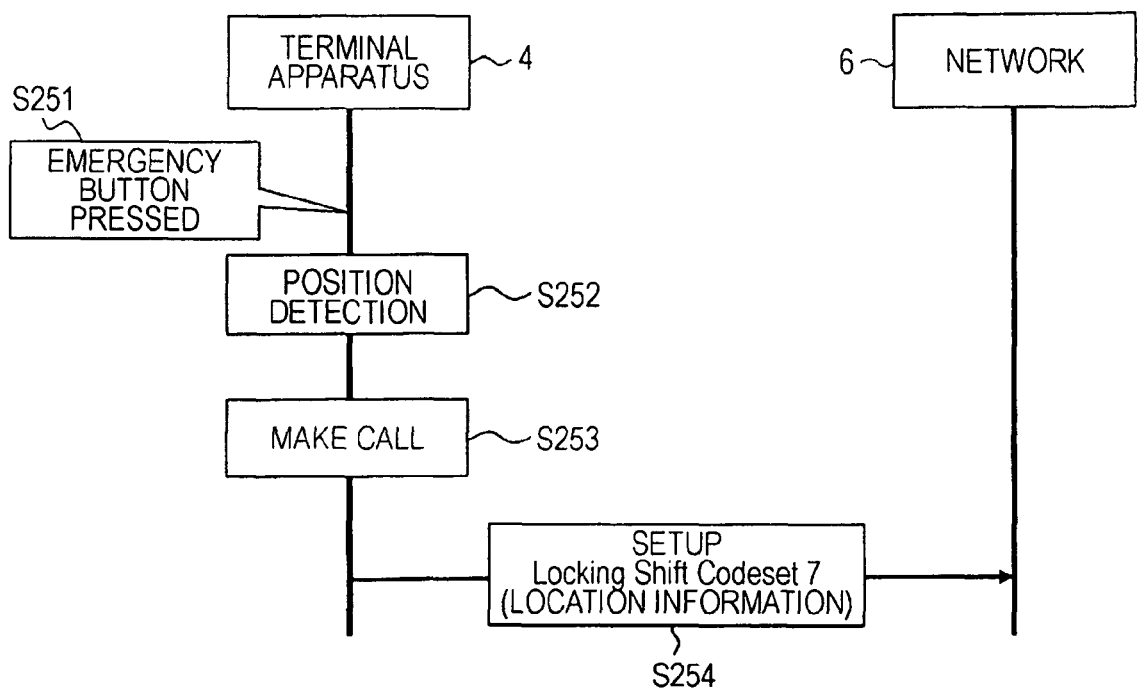
FIG. 22 is a diagram illustrating processing performed between a terminal apparatus and a network when an emergency call is made in an embodiment.
Figure 23:
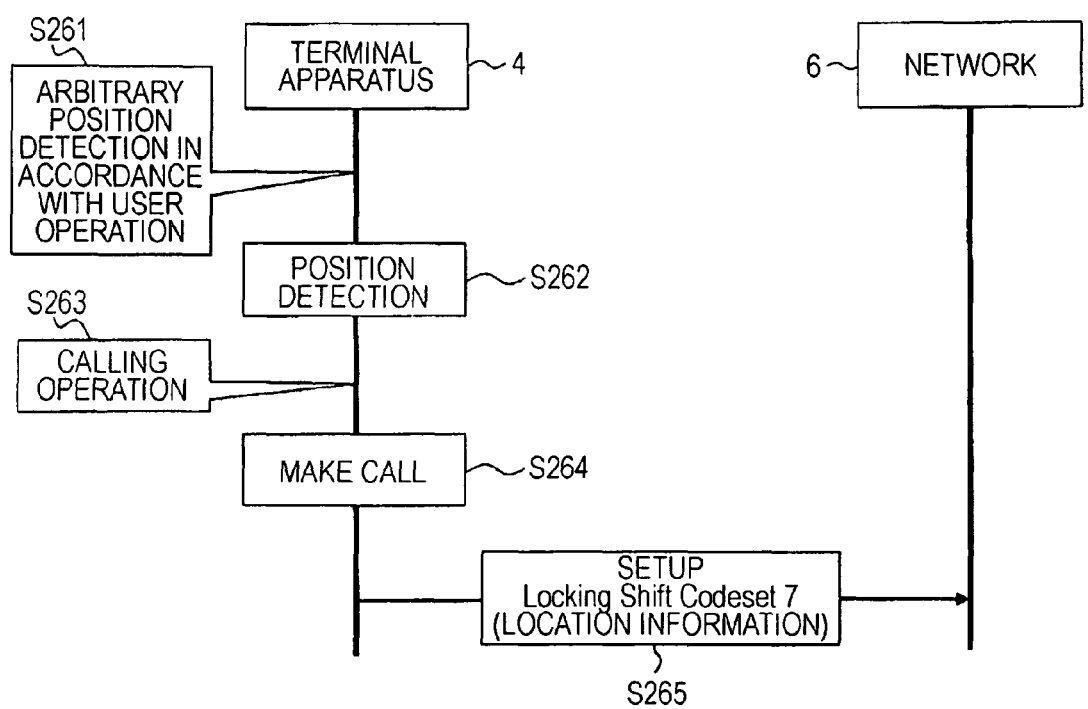
FIG. 23 is a diagram illustrating processing performed between the terminal apparatus and the network when a call is made at normal times in an embodiment.
Figure 24:
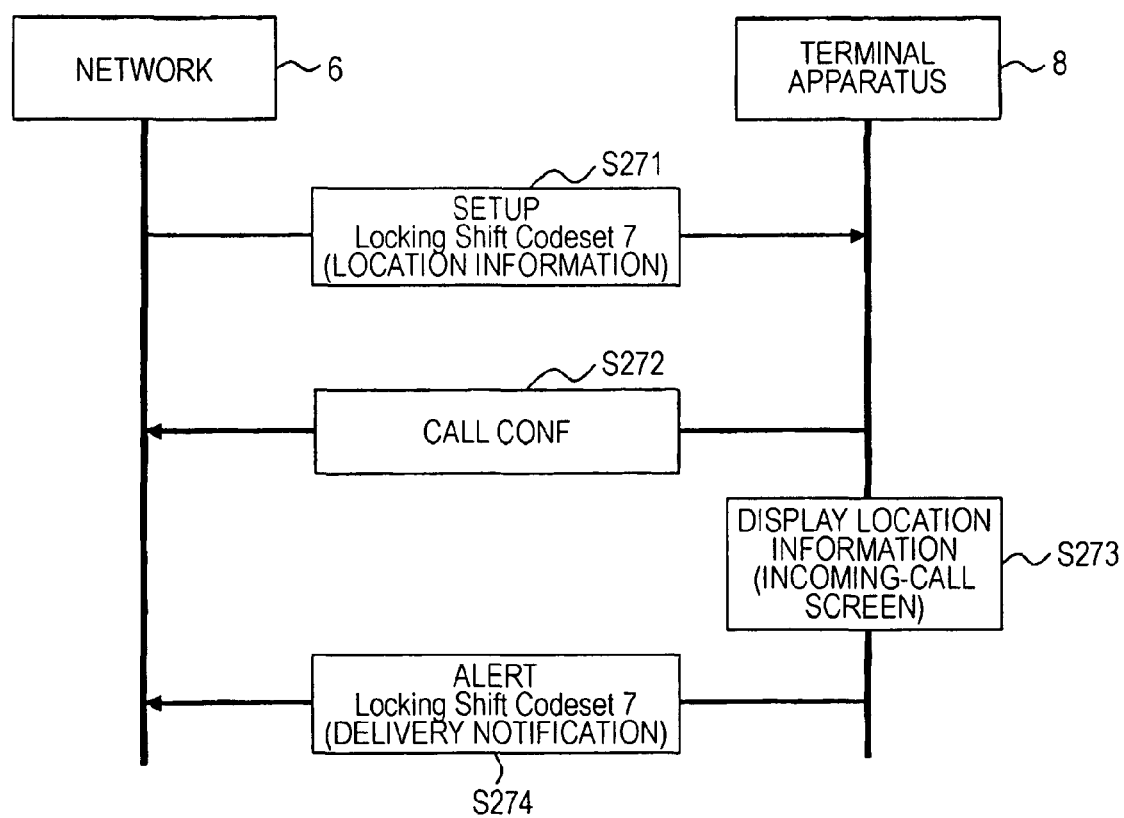
FIG. 24 is a diagram illustrating processing performed between the network and a terminal apparatus when a call arrives in an embodiment.
Figure 25:
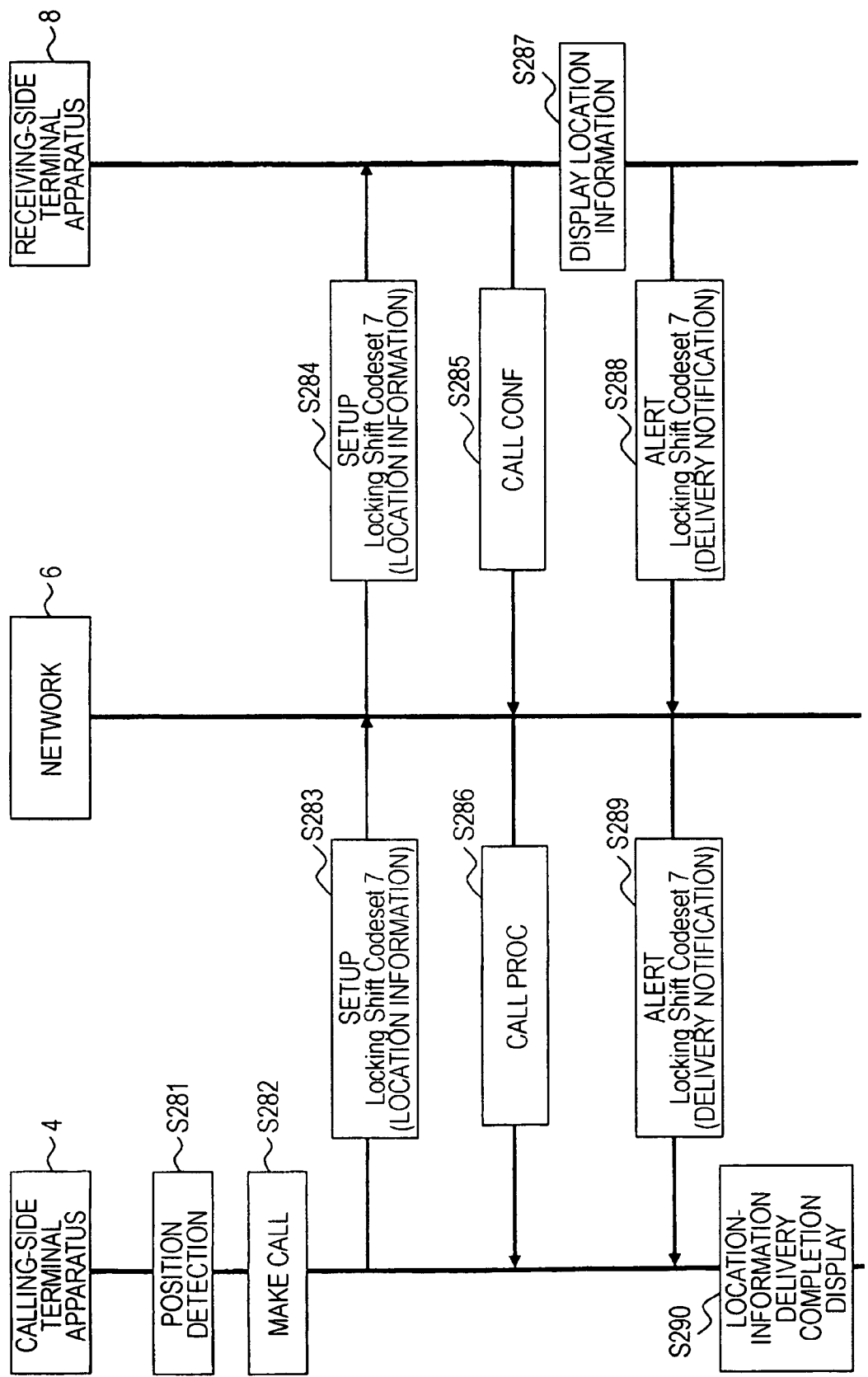
FIG. 25 is a diagram illustrating transmission-and-reception timing of location information in an embodiment, the transmission and reception being performed between terminal apparatuses.
Figure 26:
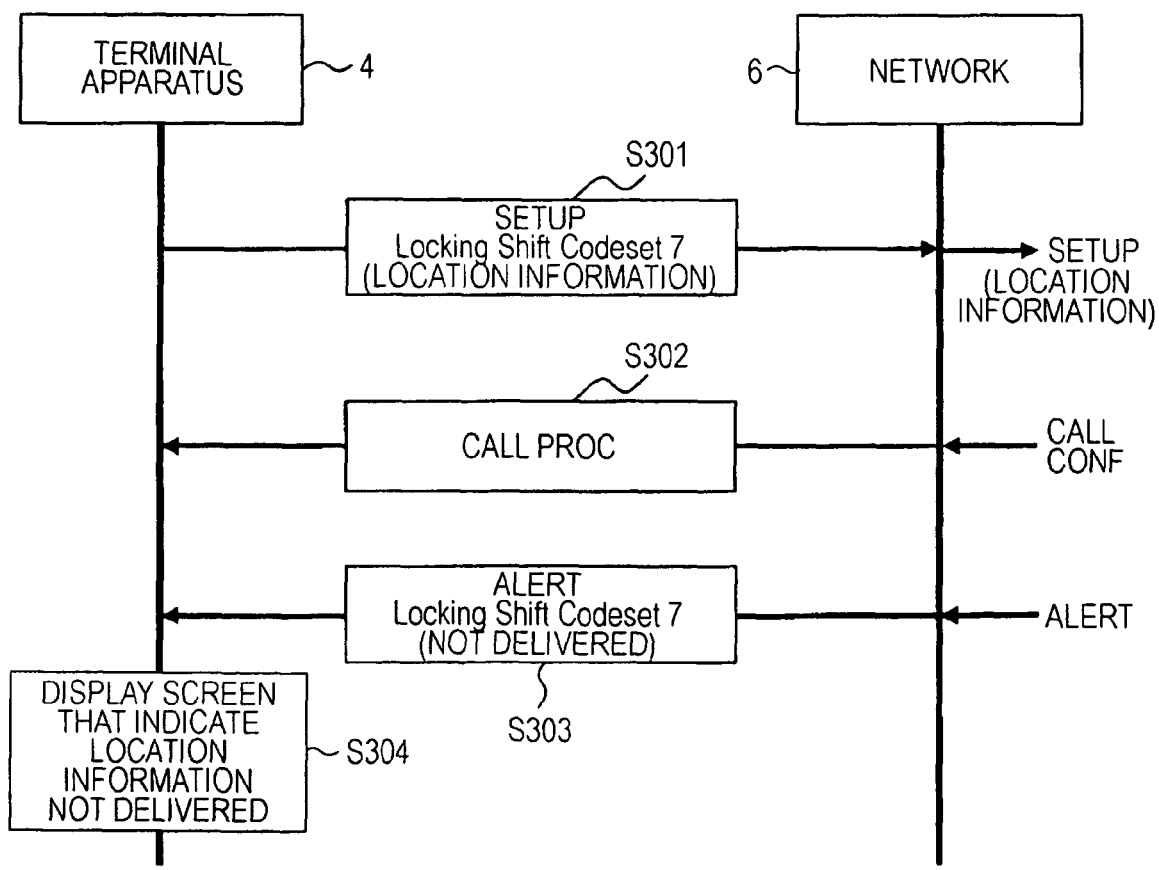
FIG. 26 is a diagram illustrating notification processing for a case in which location information was not delivered in an embodiment.

Next, with reference to FIGS. 22, 23, 24, 25, and 26, transmission and reception of location information performed between terminal apparatuses and a transmission-and-reception timing thereof will be described. FIG. 22 is a diagram illustrating processing performed between a terminal apparatus and a network when an emergency call is made in an embodiment. FIG. 23 is a diagram illustrating processing performed between the terminal apparatus and the network when a call is made at normal times in an embodiment. FIG. 24 is a diagram illustrating processing performed between the network and a terminal apparatus when a call arrives in an embodiment. FIG. 25 is a diagram illustrating transmission-and-reception timing of location information in an embodiment, the transmission and reception being performed between terminal apparatuses. FIG. 26 is a diagram illustrating notification processing for a case in which location information was not delivered in an embodiment. Processing procedures illustrated in FIGS. 22, 23, 24, 25, and 26 are examples, and a mobile apparatus and a communication system disclosed herein are not limited thereto. In FIGS. 22, 23, 24, 25, and 26, components the same as those illustrated in FIGS. 11, 12, 13, 14, and 15 are denoted by the same or similar reference numerals.

The processing procedure performed between the terminal apparatus 4 and the network 6 in a case in which an emergency call is made is illustrated in FIG. 22. In the terminal apparatus 4, pressing of the emergency button 46 (step S251) triggers automatic execution of position detection (step S252) and makes a call (step S253). When this call is made, the location information indicating the location of the terminal apparatus 4, that is, a parameter "Locking Shift Codeset 7" (location information) is added to the SETUP signal and transmitted to the network 6 (step S254). The location information added to the SETUP signal.

A processing procedure performed between the terminal apparatus 4 and the network 6 at normal times is illustrated in FIG. 23. In the terminal apparatus 4, in accordance with a command to perform position detection, which is input in accordance with a user operation (step S261), position detection is executed (step S262). In accordance with a user operation for making a call (step S263), a call is made from the terminal apparatus 4 (step S264), and the SETUP signal to which the parameter "Locking Shift Codeset 7" (location information) has been added is transmitted to the network 6 (step S265).

In the processing performed between the network 6 and the terminal apparatus 8 in a case in which a call arrives, when the terminal apparatus 8 receives the SETUP signal including the parameter "Locking Shift Codeset 7" (location information) from the network 6, the map database 62 within the terminal apparatus 8 or the map database 20 connected via the network 6 is accessed. The terminal apparatus 8 displays the location information on the display screen 78 which shows an incoming-call screen illustrated in FIG. 7A, and transmits, to the network 6, the ALERT signal in which a delivery notification indicating that the location information was displayed is set to the parameter "Locking Shift Codeset 7".

In this processing, as illustrated in FIG. 24, the SETUP signal to which the above-described parameter "Locking Shift Codeset 7" (location information) has been added is sent from the network 6 to the terminal apparatus 8 (step S271), and the CALL CONF signal is sent as a response signal to the network 6 (step S272). The location information of the terminal apparatus 4 is displayed on the display screen 78 of the terminal apparatus 8 (step S273). After this location information has been displayed, an ALERT signal to which "Locking Shift Codeset 7" (delivery notification) has been added is transmitted from the terminal apparatus 8 to the network 6 (step S274).

A transmission-and-reception timing of location information, the transmission and reception being performed between the terminal apparatuses 4 and 8, is illustrated in FIG. 25. After position detection has been performed at the terminal apparatus 4 (step S281), which is a calling-side apparatus, a call is made (step S282), and the SETUP signal to which the parameter "Locking Shift Codeset 7" (location information) has been added is transmitted to the network 6 (step S283). The SETUP signal to which the parameter "Locking Shift Codeset 7" (location information) has been added is transmitted from the network 6 to the terminal apparatus 8 (step S284), which is a receiving-side apparatus. The CALL CONF signal is transmitted from the terminal apparatus 8 to the network 6 (step S285). The CALL PROC signal is transmitted from the network 6 to the terminal apparatus 4 (step S286).

When the terminal apparatus 8, which is a receiving-side apparatus, receives the SETUP signal to which the parameter "Locking Shift Codeset 7" (location information) has been added (step S284), the terminal apparatus 8 displays the location information (step S287), and transmits, to the network 6, the ALERT signal to which "Locking Shift Codeset 7" (delivery notification) has been added as notification processing thereof (step S288). Then, the ALERT signal to which "Locking Shift Codeset 7" (delivery notification) has been added is transmitted from the network 6 to the terminal apparatus 4 (step S289). The terminal apparatus 4, the calling-side apparatus, which has received the delivery notification performs location-information delivery-completion display on the display screen 68 (step S290), and notifies completion of delivery of the location information to the user of the terminal apparatus 4.

The terminal apparatus 4 displays whether the location information has been displayed at the terminal apparatus 8, which is a receiving-side apparatus, on the display screen 68 which shows a calling screen as illustrated in FIG. 8, in accordance with the delivery notification set in the ALERT signal transmitted from the network 6. This display screen 68 is displayed after reception of the ALERT signal and before reception of a CONNECT signal. Here, when the location information is not displayed at the terminal apparatus 8, which is a receiving-side apparatus, the delivery notification is not set in the ALERT signal. Thus, display indicating that the location information was not delivered is performed on the display screen 68.

The processing in a case in which display indicating that the location information was not delivered is performed is illustrated in FIG. 26. The SETUP signal to which the parameter "Locking Shift Codeset7" (location information) has been added is transmitted to the network 6 from the terminal apparatus 4 (step S301). The CALL PROC signal is transmitted to the terminal apparatus 4 from the network 6 which received the CALL CONF signal from the terminal apparatus 8, which is not illustrated (step S302). In a case in which the location information is not displayed, the ALERT signal to which the parameter "Locking Shift Codeset7" (delivery notification) has not been added is transmitted from the network 6 to the terminal apparatus 4 (step S303), the ALERT signal having been transmitted from the terminal apparatus 8, not illustrated, to the network 6. In this case, since the delivery notification is not set in the ALERT signal, information indicating that the location information was not delivered is displayed on the display screen 68 of the terminal apparatus 4 illustrated in FIG. 8 (step S304).

As is clear from the above-described embodiments, the location information acquired as a result of position detection and a phone number thereof can be sent together when a call is made, and can be realized using the "Locking shift procedure" defined by 3G (3rd Generation) TS24.008 or a similar procedure. As illustrated in FIGS. 19 and 20, by setting information equivalent to the "UE positioning GPS reference UE position" in the "Location and Motion IE contents" portion, the location information can be sent to the terminal apparatus 8, a receiving-side apparatus (FIGS. 19, 20, 22, 23, 24, 25, and 26).

When the acceleration sensor unit 42 is provided, the moving speed measured by the acceleration sensor unit 42 can be sent with the location information when a call is made. The data format thereof is illustrated in FIG. 19. As illustrated in FIG. 19, by adding movement information indicating the moving speed to the parameter "Location and Motion IE contents" portion, the location information that includes the movement information can be sent.

According to a mobile apparatus and a communication system disclosed herein, the following advantages can be acquired.

(1) Since a notification of the location from which a call is being made is sent before a phone connection is established, a recipient can know the location of a caller before the phone connection is established. Thus, the convenience of mobile communication is increased.

(2) After the location information has been acquired, the location information can be promptly sent to an intended party such as an emergency-call acceptance institution at same time an emergency call or the like is made, whereby this is useful in helping a caller survive an unexpected contingency. Thus, the functionality of the mobile apparatus is improved.

(3) Since, for example, who or where the caller is can be estimated from the location information of the calling-side apparatus, the convenience of a mobile apparatus is improved.

In the above, example embodiments and the like according to a mobile apparatus and a communication system disclosed herein have been described; however, the mobile apparatus and the communication system disclosed herein are not limited thereto. As a matter of course, a variety of modifications and changes can be made by those skilled in the art on the basis of the appended claims or the gist of the invention disclosed in the example embodiments for realizing the invention. As a matter of course, such a variety of modifications and changes are within the scope of the invention.

All examples and conditional language recited herein for pedagogical purposes to aid the reader in understanding the principles of the invention and the concepts contributed by the inventor to furthering the art, and are to be construed as being without limitation to such specifically recited examples and conditions, nor does the organization of such example in the specification relate to a showing of the superiority and inferiority of the invention. Although the embodiments of the present inventions have been described in detail, it should be understood that the various changes, substitutions, and alterations could be made hereto without departing from the sprit and scope and scope of the invention.

The invention claimed is:

1. A mobile apparatus having a calling function, the mobile apparatus comprising:
    a location-information acquisition unit to acquire location information indicative of a location of the mobile apparatus;
    a location-information notification unit to send the location information to a receiving-side apparatus when a call is made to the receiving-side apparatus, the location-information notification unit being further operable to provide, when the call is being made to a receiving-side apparatus, the location information in a manner such that, before a communication connection is established therewith, the receiving-side apparatus can recognize a physical location where the call is being originated based upon the location data; and
    a display unit to display, before the communication connection is established, information which indicates whether the receiving-side apparatus has displayed the location information.

2. The mobile apparatus according to claim 1, further comprising:
    a command unit to issue a command for sending the location information,
    wherein, in response to the command from the command unit, the location-information notification unit is further operable to make the call and to send the location information to the receiving-side apparatus.

3. The mobile apparatus according to claim 1, further comprising:
    a recognition unit to recognize that the call is an emergency call;
    wherein the location-information acquisition unit is further operable to automatically acquire the location information if the call is an emergency call.

4. The mobile apparatus according to claim 1, further comprising:
    an input unit to receive a command from a user of the mobile apparatus regarding obtaining the location information;
    wherein the location-information acquisition unit is further operable to acquire the location information in response to the command from the user.

5. The mobile apparatus according to claim 4, further comprising:
    a prompting unit to prompt the user, before making the call with options regarding including the location information when making the call or not including the location information when making the call;
    the input unit further being operable to receive an instruction from the user regarding whether to include or not include the location information; and
    the location-information notification unit being further operable to selectively include or not include the location information when making the call according to the instruction from the user.

6. The mobile apparatus according to claim 1, wherein the location information includes information indicative of longitude and latitude.

7. A location notification system for sending the location of a mobile apparatus, the location notification system comprising:
    a location-information notification unit to acquire location information indicative of the location of the mobile apparatus, and to send the location information when a call is made from the mobile apparatus;
    a display unit to receive the location information from the location-information notification unit when the call arrives and to display the location information after the call has arrived and before a phone connection is established; and
    a receiving unit to receive, before the communication connection is established, information which indicates whether the display unit has displayed the location information.

8. The location notification system according to claim 7, further comprising a command unit to command the location-information notification unit to issue to send the location information.

9. The location notification system according to claim 7, wherein the location information includes information indicative of longitude and latitude.

10. A location notification method for a mobile apparatus having a calling function, the location notification method comprising:
    acquiring location information indicative of the location of the mobile apparatus;
    sending the location information to a receiving-side apparatus when a call is made to the receiving-side apparatus, the sending including providing, when the call is being made to the receiving-side apparatus, the location information in a manner such that, before a communication connection is established therewith, the receiving-side apparatus can recognize a physical location where the call is being originated based upon the location data; and
    displaying, before the communication connection is established, information which indicates whether the receiving-side apparatus has displayed the location information.

11. The location notification method according to claim 10, further comprising:
    issuing a command to send the location information; and
    calling and sending the location information to the receiving-side apparatus, in response to the issued command.

12. The location notification method according to claim 10, further comprising:
   recognizing that the call is an emergency call;
   wherein the acquiring is performed automatically if the call is an emergency call.

13. The location notification method according to claim 10, further comprising:
   receiving a command from a user of the mobile apparatus regarding obtaining the location information;
   wherein the acquiring is performed in response to the command from the user.

14. The location notification method according to claim 13, further comprising:
   prompting, before making the call, the user with options regarding including the location information when making the call or not including the location information when making the call;
   receiving an instruction from the user regarding whether to include or not include the location information; and
   selectively including or not including the location information when making the call according to the instruction from the user.

15. The method according to claim 10, wherein the location information includes information indicative of longitude and latitude.

* * * * *